US011023589B2

(12) United States Patent
Liguori et al.

(10) Patent No.: US 11,023,589 B2
(45) Date of Patent: *Jun. 1, 2021

(54) SECURE BOOTING OF VIRTUALIZATION MANAGERS

(71) Applicant: Amazon Technologies, Inc., Seattle, WA (US)

(72) Inventors: Anthony Nicholas Liguori, Bainbridge Island, WA (US); Barak Wasserstrom, Mitzpe Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,391

(22) Filed: Jun. 7, 2019

(65) Prior Publication Data

US 2019/0311128 A1    Oct. 10, 2019

Related U.S. Application Data

(63) Continuation of application No. 15/199,479, filed on Jun. 30, 2016, now Pat. No. 10,318,737.

(51) Int. Cl.
*G06F 21/57* (2013.01)
*G06F 9/455* (2018.01)
(Continued)

(52) U.S. Cl.
CPC .......... *G06F 21/575* (2013.01); *G06F 9/4405* (2013.01); *G06F 9/4416* (2013.01);
(Continued)

(58) Field of Classification Search
CPC .... G06F 21/575; G06F 9/4405; G06F 9/4416; G06F 9/455; G06F 9/45558;
(Continued)

(56) References Cited

U.S. PATENT DOCUMENTS 7,484,091 B2    1/2009 Bade et al.
7,996,836 B1    8/2011 McCorkendale et al.
(Continued)

FOREIGN PATENT DOCUMENTS

EP        1701259        9/2006

OTHER PUBLICATIONS

U.S. Appl. No. 15/173,445, filed Jun. 3, 2016, Wilson, et al.
(Continued)

*Primary Examiner* — Ji H Bae
(74) *Attorney, Agent, or Firm* — Robert C. Kowert; Kowert, Hood, Munyon, Rankin & Goetzel, P.C.

(57) ABSTRACT

A multi-phase boot operation of a virtualization manager at a virtualization host is initiated at an offload card. In a first phase of the boot, a security key stored in a tamper-resistant location of the offload card is used. In a second phase, firmware programs are measured using a security module, and a first version of a virtualization coordinator is instantiated at the offload card. The first version of the virtualization coordinator obtains a different version of the virtualization coordinator and launches the different version at the offload card. Other components of the virtualization manager (such as various hypervisor components that do not run at the offload card) are launched by the different version of the virtualization controller.

20 Claims, 24 Drawing Sheets

(51) Int. Cl.
*G06F 9/4401* (2018.01)
*H04L 9/00* (2006.01)
*H04L 9/06* (2006.01)
*H04L 9/08* (2006.01)
*H04L 9/14* (2006.01)
*H04L 9/30* (2006.01)
*H04L 9/32* (2006.01)
*H04L 29/06* (2006.01)

(52) U.S. Cl.
CPC .......... *G06F 9/455* (2013.01); *G06F 9/45558* (2013.01); *H04L 9/006* (2013.01); *H04L 9/0643* (2013.01); *H04L 9/0861* (2013.01); *H04L 9/14* (2013.01); *H04L 9/302* (2013.01); *H04L 9/3239* (2013.01); *H04L 9/3249* (2013.01); *H04L 9/3263* (2013.01); *H04L 63/0823* (2013.01); *G06F 2009/45575* (2013.01); *G06F 2221/034* (2013.01)

(58) Field of Classification Search
CPC ..... G06F 2009/45575; G06F 2221/034; H04L 9/006; H04L 9/0643; H04L 9/0861; H04L 9/14; H04L 9/302; H04L 9/3239; H04L 9/3249; H04L 9/3263; H04L 63/0823
USPC .............................................. 713/1, 2; 718/1
See application file for complete search history.

(56) References Cited

U.S. PATENT DOCUMENTS

| | | | |
|---|---|---|---|
| 8,032,899 B2 | 10/2011 | Archer et al. | |
| 8,127,292 B1 | 2/2012 | Dobrovolskiy et al. | |
| 8,201,161 B2 | 6/2012 | Challener et al. | |
| 8,239,557 B2 | 8/2012 | McCune et al. | |
| 8,433,802 B2 | 4/2013 | Head et al. | |
| 8,514,868 B2 | 8/2013 | Hill | |
| 9,323,552 B1 | 4/2016 | Adogla et al. | |
| 9,361,145 B1 | 6/2016 | Wilson et al. | |
| 9,667,414 B1 | 5/2017 | Brandwine et al. | |
| 10,318,737 B2 | 6/2019 | Liguori et al. | |
| 2005/0251806 A1 | 11/2005 | Auslander et al. | |
| 2008/0244553 A1 | 10/2008 | Cromer et al. | |
| 2010/0070970 A1 | 3/2010 | Hu et al. | |
| 2010/0122250 A1* | 5/2010 | Challener | G06F 8/61 718/1 |
| 2010/0332722 A1* | 12/2010 | Oiwa | G06F 9/45558 711/6 |
| 2011/0107073 A1* | 5/2011 | Dalton | G06F 9/4401 713/2 |
| 2011/0131443 A1 | 6/2011 | Laor et al. | |
| 2014/0282498 A1* | 9/2014 | Rosato | G06F 9/5077 718/1 |
| 2014/0298317 A1* | 10/2014 | Devine | G06F 9/50 717/174 |
| 2016/0026573 A1 | 1/2016 | Jacobs et al. | |
| 2016/0077845 A1 | 3/2016 | Earl et al. | |
| 2016/0170781 A1 | 6/2016 | Liguori et al. | |
| 2016/0210457 A1 | 7/2016 | Cleeton et al. | |

OTHER PUBLICATIONS

U.S. Appl. No. 14/869,907, filed Sep. 29, 2015, David Sean Russell.
U.S. Appl. No. 14/864,682, filed Sep. 24, 2015, Danilov, et al.
U.S. Appl. No. 14/535,056, filed Nov. 6, 2014, Potlapally, et al.
U.S. Appl. No. 15/199,489, filed Jun. 30, 2016, Liguori, et al.
U.S. Appl. No. 15/199,497, filed Jun. 30, 2016, Liguori, et al.
Zsgur Ulusoy, "Processing Real-Time Transactions in a Replicated Database System," 1994 Kluwer Academic Publishers, Boston, Revised Sep. 10, 1993, pp. 1-32.
Sergio Almeida, et al., "ChainReaction: a Causal+ Consistent Datastore based on Chain Replication," Eurosys'13 Apr. 15-17, 2013, Prague, Czech Republic, Copyright 2013 ACM 978-1-4503-1994-2/13/04, pp. 85-98.
Scott Lystig Fritchie, "Chain Replication in Theory and in Practice," Erlang'10, Sep. 30, 2010, Baltimore, Maryland, USA. Copyright 2010 ACM 978-1-4503-0253-1/10/09, pp. 1-11.
Robbed van Renesse, et al, "Chain Replication for Supporting High Throughput and Availability," USENIX Association, OSDI 2004: 6th Symposium on Operating Systems Design and Implementation, pp. 91-104.
Philip A. Bernstein, et al, "Concurrency Control and Recovery in Database Systems," Addison-Wesley Publication Company, ISBN 0-201-10715-5, 1987, pp. 1-58.
From Wikipedia, the free encyclopedia, "Bromium," downloaded on Jun. 27, 2016 from https://en.wikipedia.org/wiki/Bromium, pp. 1-4.
Xen, "Dom0" downloaded Jun. 6, 2016 from http://wiki.xen.org/wiki/Dom0, last updated Mar. 29, 2015, pp. 1-2.
Amazon Web Services, "Amazon Elastic Compute Cloud: User Guide for Linux Instances," Latest Version update 2015, pp. 1-816.
IBM, General Information, Version 4, Release 3.0, Fifth Edition, Apr. 2002, pp. 1-101.
From Wikipedia, the free encyclopedia, "Hypervisor," downloaded Jun. 6, 2016 from https://en.wikipedia.org/wiki/Hypervisor, pp. 1-7.
Axel Buecker, et al., "Reduce Risk and Improve Security on IBM Mainframes: vol. 1 Architecture and Platform Security," Redbooks, IBM, Dec. 2014, pp. 1-308.
From Wikipedia, the free encyclopedia, "VMware ESX," downloaded Jun. 6, 2016 from https://en.wikipedia.org/wiki/VMware_ESX, pp. 1-13.
From Wikipedia, the free encyclopedia, "Xen," downloaded from Jun. 6, 2016 from https://en.wikipedia.org/wiki/Xen, pp. 1-12.
U.S. Appl. No. 15/236,116, filed Aug. 12, 2016, Konrad Jan Miller et al.
Sangster, et al., TCG Published, Virtualized Trusted Platform Architecture Specification, Specification Version 1.0, Revision 0.26, Sep. 27, 2011, pp. 1-60.
Network Functions Virtualisation (NFV); NFV Security; Security and Trust Guidance, ETSI GS NFV-SEC 003, V1.1.2, downloaded by EP on Jun. 4, 2016, pp. 1-57.
International Search Report and Written Opinion from PCT/US2017/040076, dated Oct. 6, 2017, pp. 1-13.

* cited by examiner

SECURE BOOTING OF VIRTUALIZATION MANAGERS

This application is a continuation of U.S. patent application Ser. No. 15/199,479, filed Jun. 30, 2016, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

A respective virtualization manager, which may for example include an administrative virtual machine instance and/or a hypervisor, may be installed on each virtualization host in various virtualization environments. The virtualization manager may be responsible, among other tasks, for starting/stopping guest virtual machines on the hosts on behalf of customers, acting as the intermediary between the guest virtual machines and various hardware components of the host and the network, collecting metrics pertaining to the guest virtual machines, and enforcing security rules. From the perspective of the operator of the virtualization environment, the resources consumed by the virtualization manager (e.g., host CPU cycles, host memory, etc.) may tend to reduce the number of guest virtual machines that can be instantiated on a host, and thereby reduce the operator's monetization level for the host hardware and associated infrastructure. In addition, in at least some cases administrative or background operations performed by the virtualization manager to support the guest virtual machines may have a tendency to interfere with time-sensitive customer applications. As such, designing a virtualization manager that efficiently meets the security and functional requirements of modern virtualization environments may represent a nontrivial challenge.

Figure 1:
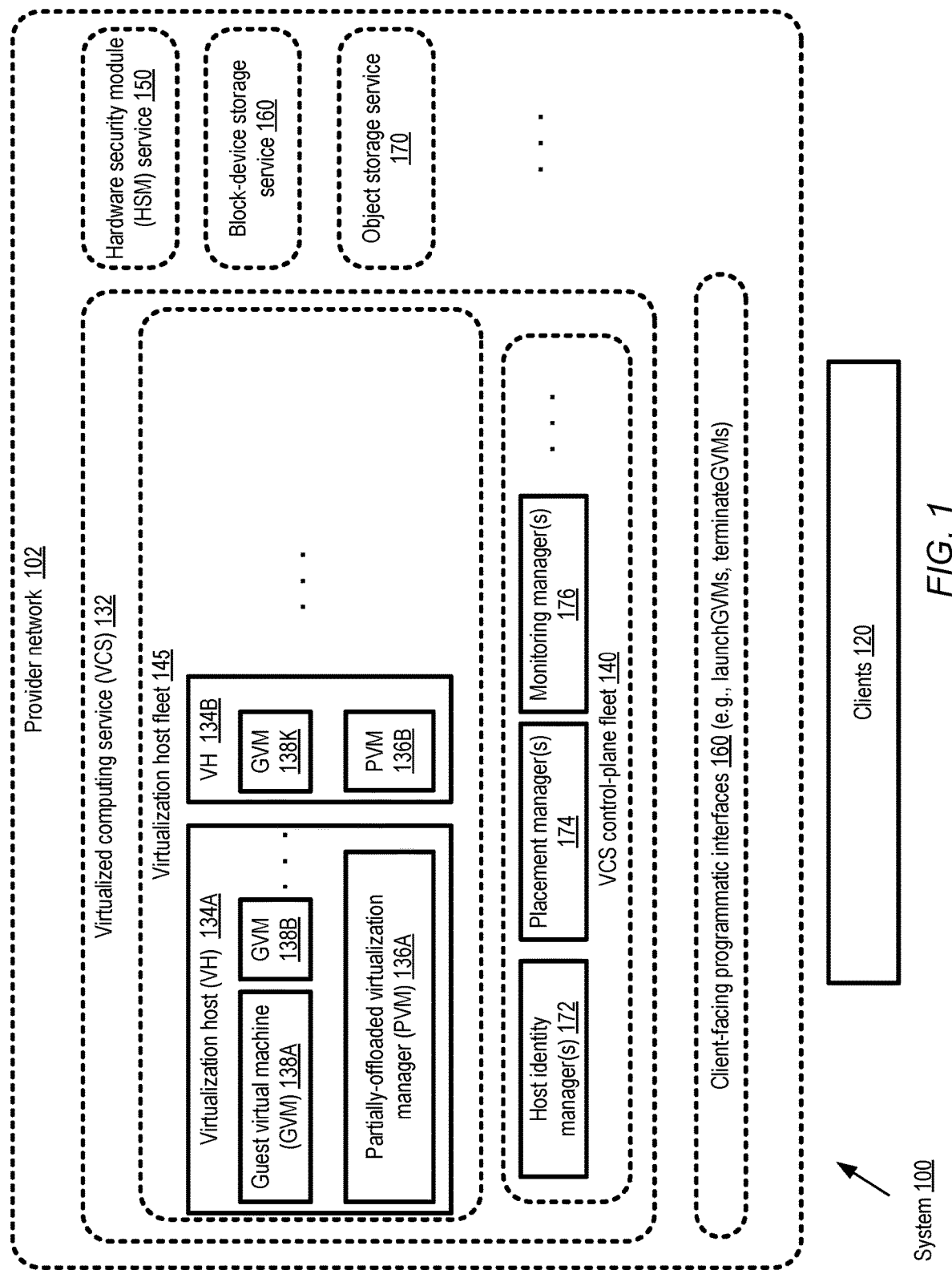
FIG. 1 illustrates an example system environment in which partially-offloaded virtualization managers may be employed at a virtualized computing service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for virtual machine management using partially-offloaded virtualization managers at virtualization hosts are described. A given virtualization host may comprise one or more primary physical CPUs (central processing units) or cores and a main memory (e.g., comprising one or more random access memory or RAM devices), in addition to various other hardware components usable for networking, interactive devices and the like in various embodiments. To support guest virtual machines on behalf of various clients, virtualized versions of the CPUs and/or portions of the main memory may be created and allocated to guest virtual machines by components of a virtualization manager, virtualized network devices may be made accessible to the guest virtual machines, and so on. A virtualization manager of the virtualization host may comprise various combinations of software, firmware and/or hardware components in different embodiments, which collectively enable guest virtual machines to be established and administered on the virtualization host.

The term "partially-offloaded" may be used herein to describe virtualization managers which have the following characteristic in various embodiments: at least some of the virtualization management tasks required for supporting guest virtual machines on the virtualization host may not be executed using the primary CPUs or cores of the virtualization host. Such tasks may be designated as "offloaded" tasks, reducing the virtualization management-related overhead on the physical CPUs of the host. Instead of using the CPUs of the host, one or more processors located on an offload card (e.g., a card accessible from the primary CPU(s) via a bus implementing a version of the Peripheral Component Interconnect—Express or PCI-E standard, or other interconnects such as a QuickPath interconnect (QPI) or UltraPath interconnect (UPI)) may be employed for at least some of the offloaded tasks in various embodiments. In other embodiments, some offloaded virtualization management tasks may be implemented at a computing device external to the virtualization host, e.g., at a separate host accessible via a network connection from the virtualization host at which the guest virtual machines run. The firmware and/or software components responsible for implementing the offloaded tasks may be generally referred to as offloaded virtualization manager components (OVMCs) or offloaded virtualization management components herein. Examples of several different OVMCs which may be employed in various embodiments, such as a virtualization controller and a network processing offloader, are described below in further detail.

In at least some embodiments, the workload associated with managing guest virtual machines may at a high level be divided into a larger portion and a smaller portion, with the larger portion being offloaded, and the smaller portion being implemented by an opportunistic hypervisor running on the virtualization host. As discussed below in further detail, the hypervisor may be described as being opportunistic in that the hypervisor utilizes a physical CPU of the host primarily when given the opportunity to do so as a result of a voluntary relinquishment of the physical CPU by a guest virtual machine (e.g., when the guest virtual machine needs to perform an input/output operation, read a timer value, or perform some other operation which cannot be completed by the guest virtual machine on its own). By default, some or all of the subcomponent processes of the hypervisor may remain quiescent or in an idle state (i.e., not consuming CPU cycles). Under most operating conditions, one or more of the subcomponents may transition from the quiescent state to an active state only when a guest virtual machine relinquishes a physical CPU. A queue or similar logical data structure comprising outstanding virtualization management tasks for the hypervisor to perform may be maintained in some such embodiments, with task entries being added to the queue at the request of the offloaded virtualization manager components (which in turn may have received requests for some of the tasks from control plane components of a virtualized computing service in some cases). When the opportunistic hypervisor is able to utilize a physical CPU, it may obtain an outstanding task from the queue, perform the corresponding operations, and then relinquish the physical CPU to enable the guest virtual machine to resume its processing.

In some embodiments, virtualization management tasks handled by the opportunistic hypervisor may be classified into at least two categories, e.g., based on the expected durations of the tasks or their relative complexity. Shorter or simpler tasks may be run to completion, while more complex or longer tasks may be dealt with using a state machine whose state transitions correspond to respective subtasks. Thus, for example, a long task T1 may be split into N different subtasks ST1, ST2, . . . , STN. When the opportunistic hypervisor is given the opportunity to utilize a physical CPU, and the hypervisor determines that T1 has not yet been completed, the next unfinished subtask STk of T1 may be identified using a persistent state machine representation of T1 in some embodiments. The hypervisor may then execute STk, update the persistent state machine to indicate that it has done so, and relinquish the physical CPU to the guest virtual machine. In general, the opportunistic hypervisor may be designed to minimize its use of the physical CPU(s) of the host, and to use a physical CPU primarily when a guest virtual machine does not expect to use the physical CPU for at least some interval (e.g., for the time required to complete an I/O operation). As a result of such opportunistic scheduling of virtualization management tasks, in at least some embodiments the variability in the performance of various types of transactions or operations initiated at the guest virtual machines may be reduced substantially. For example, if a given guest virtual machine is used for an application which comprises time-sensitive transactions, the variation in transaction response times may be minimized or lowered (e.g., compared to other virtualization management techniques) due to the employment of the opportunistic hypervisor. The variation in the responsiveness of application operations, especially short-duration time-sensitive operations, may be referred to as "jitter" or "CPU jitter" herein.

In at least some embodiments, the virtualization managers may be implemented at a virtualized computing service of a provider network. Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. The resources of a provider network may in some cases be distributed across multiple data centers, which in turn may be distributed among numerous cities, states and countries. In at least one embodiment, the kinds of virtualization managers described herein may be deployed at hosts which are located at data centers external to a provider network; for example, various administrative or control plane components of a virtualized computing service may be executed within a provider network, and such control plane components may communicate with a partially-offloaded virtualization manager running at a virtualization host located at a customer-owned data center (or at some other premises external to the provider network).

A virtualized computing service may support multi-tenant mode for allotment of guest virtual machines to virtualization hosts in at least some embodiments. In multi-tenant mode, a given virtualization host may be used to instantiate respective guest virtual machines for several different customers. In contrast, in single-tenant mode, which may also or instead be supported in various embodiments, a given virtualization host may be used only for guest virtual machine(s) of a single client. Especially in multi-tenant mode, and even in single tenant mode, ensuring that the security and/or isolation requirements of the clients are met may be critical. From the perspective of the virtualized computing service provider, virtualization manager components should ideally be designed such that their security mechanisms cannot (with a very high probability) be successfully breached as a result of external attacks or bugs. In the rare cases where a breach does occur, the breach should be identified as quickly as possible, and remedial actions to reduce the impact of the breach should be taken (such as disabling or shutting down the virtualization manager).

In order to help meet these and other security requirements, in at least some embodiments a secure multi-phase boot procedure may be implemented for partially-offloaded virtualization managers. A virtualization controller (one of the offloaded components of the virtualization manager) may be responsible for orchestrating the secure boot procedure at a given virtualization host in various embodiments. During manufacturing of a virtualization host's components, a public key of a selected security key pair may be burned into a tamper-resistant device mounted on a card at which one or more offloaded virtualization manager components (including the virtualization controller) are to run. The private key of the ley pair may be stored separately, for example, at a hardware security module (HSM) appliance accessible to the virtualized computing service (for example, via an HSM service implemented at a provider network). In a first phase of the boot procedure, the public key may be used to validate the signatures of one or more firmware programs in various embodiments. This first phase, in which security is enforced using a key burned into the hardware of an offload card, may typically comprise the execution of firmware (stored, for example, into serial peripheral interface (SPI) flash storage on the offload card) which has a low probability of being changed/updated during the lifetime of the virtualization host. In at least some embodiments, at least some of the firmware loaded during the first phase may no longer be used after the first phase ends. That is, after the first phase of the boot completes, the programs loaded during the first phase may not be needed again until the next boot. If the first phase fails (e.g., if a firmware program's signature cannot be verified using the burnt-in key), the virtualization host may be rendered unbootable (or very difficult to boot) in at least one embodiment.

If the first phase succeeds, a second phase of the boot procedure may be initiated in various embodiments, during which various firmware/software programs may be "measured" using a security module (also mounted on the offload card in at least some implementations). In some embodiments, the security module may be implemented in accordance with a specification approved by a standards organization, such as any of various versions of Trusted Platform Module specifications, submitted by the Trusted Computing Group consortium and approved by the International Organization for Standardization and the International Electrotechnical Commission (ISO/IEC). In such embodiments, the security module may be referred to as a trusted platform module or TPM. In other embodiments, other hardware components or devices which support similar security-related features as those of TPMs, but are not necessarily fully compliant with the TPM specifications, may be used. In much of the following description, TPMs may be used as the primary examples of security modules which are used by the virtualization managers during boot and for other operations such as checking the software state of a host; however, the TPM-utilizing algorithms described herein may be used with equal success in embodiments in which other types of security modules than TPMs are available. A security module such as a TPM may be used for various cryptographic, hashing and random-number-related operations as discussed below in further detail. One of the functions supported by the TPM may be to store evidence of software/firmware states (and state changes) using hash values stored in a set of processor control registers (PCRs). During the measurement of a given software/firmware program M1 using a selected PCR, a cryptographic-strength hash value H2 based on the current contents (H1) of the PCR (e.g., some initial value used for the PCR, or a hash value corresponding to some other software/firmware program) and the contents of the program M1 may be generated. The new hash value H2, which depends on the previous state of the PCR and the program being "measured", may then be stored in the PCR, in an operation referred to as "extending the PCR by M1". In effect, the PCR extension mechanism may enable the history of a sequence of changes or events to be stored in hardware in a manner which is (nearly) impossible to forge, while at the same time being verifiable (e.g., by executing the sequence of hashing operations on the expected or known versions of the programs and comparing the PCR contents with the final result of the sequence). During this second "measuring" phase of the boot procedure, evidence of the exact versions of firmware/software being loaded may thus be stored in one or more of the TPM's PCRs in various embodiments. In contrast to the firmware used in the first phase of the boot, new versions of the firmware loaded in the second phase may at least sometimes be deployed during the lifetime of the virtualization host in some embodiments, and a hash-based measurement of the changed versions may then be available from the security module.

Towards the end of the second phase of the boot procedure, a special stripped-down or minimal version of the virtualization controller may be launched at one or more processors of the offload card in various embodiments. The primary goal of using the special minimal version may comprise providing enough functionality to be able to perform a live update to a more full-featured version of the virtualization controller. This different version may be obtained at the offload card from an encrypted storage device (e.g., another flash-memory component or a solid-state drive). The key that is to be used to decrypt the different version may be stored in the security module, and may only be made available to the minimal version of the virtualization controller if the state of the security module (e.g., one or more PCR values) indicates that the previous phases of the boot procedure have succeeded. Details regarding the manner in which the storage device used for new versions of the virtualization controller is initially encrypted (the very first time the host is started up) are provided below. The different full-featured version of the virtualization controller may then be launched to replace the minimal version (i.e., on the same offload device processor(s) at which the minimal version was running). This in-place replacement technique may potentially be used to deploy several new versions of the virtualization controller over time, e.g., with the same minimal version being launched first in each case towards the end of the "measuring" phase.

After the fully-functional version of the virtualization controller is in place, signature checking may be used as the security mechanism with respect to initializing or launching various other components of the partially-offloaded virtualization manager (e.g., a network processing offloader and/or a hypervisor) in different embodiments. Some of these additional components may also be run at an offload card (e.g., either the same card at which the virtualization controller runs, or a different offload card) in various embodiments, while others may be run on the primary CPUs of the virtualization host. The fully-functional version of the virtualization controller may participate in the enrollment of the virtualization host in a network security infrastructure of the virtualized computing service in various embodiments, e.g., via interactions with a host identity management service as discussed below, so that new versions of various software and/or firmware may be obtained at the virtualization host securely during the lifetime of the virtualization host. After all the components of the virtualization manager have been launched successfully and the multi-phase secure boot procedure has been completed, normal virtualization management operations may be initiated on behalf of clients of the virtual computing service—e.g., guest virtual machines may be instantiated (or terminated) by the virtualization manager as and when requested. If any of the operations of the boot failed due to security-related errors, the virtualization host would either be placed in an unbootable state (if the error occurred during the first phase), or evidence of the failure would be trackable using the TPM and/or the network security infrastructure components.

In at least some embodiments, memory allocation decisions with respect to a substantial portion of the main memory of a virtualization host may be handled by an offloaded virtualization manager component, thereby further reducing the workload of the opportunistic hypervisor and enabling live updates of the hypervisor to be performed. In one such embodiment, one section (e.g., a few hundred megabytes out of several gigabytes) of the main memory may be set aside for the opportunistic hypervisor, while allocation of the remaining section may be managed by an offloaded component (such as a memory allocator of the virtualization coordinator). After the hypervisor is started up (e.g., towards the end of the multi-phase boot procedure discussed above), the offloaded component may submit a memory inventory query to the hypervisor, and a response indicating the amount of main memory available for guest virtual machines (which is to be allocated to individual guest virtual machines by the offloaded component) may be provided. As and when new guest virtual machines are launched, the specific portions of physical memory to be used for the guest virtual machines (and for metadata such as device state information of the guest virtual machines) may be selected from the available memory by the offloaded virtualization manager component. The hypervisor may be notified regarding the allocation decisions for the guest virtual machines by the offloaded virtualization manager component. The hypervisor may set up its own page table (e.g., with relatively small page sizes such as four kilobytes) for memory allocations within the hypervisor-managed section, while the locations of the page tables for respective guest virtual machines (which may use different page sizes than the hypervisor) may be selected by the offloaded virtualization manager component. The particular memory region(s) to be used for a guest virtual machine's page table may be selected by the offloaded virtualization manager component in at least some embodiments, and an indication of the selected region(s) may be provided in a data structure (which may be referred to herein as paging metadata) to the hypervisor. The hypervisor may then use the information contained in the data structure to set up the page table for the guest virtual machine. In at least some embodiments, some of the hypervisor-managed section of the main memory may be reserved for live updates of the hypervisor (e.g., to store the executable image representing a new version of the hypervisor). Further details regarding memory management and live updates of hypervisors are provided below.

Example System Environment

FIG. 1 illustrates an example system environment in which partially-offloaded virtualization managers may be employed at a virtualized computing service, according to at least some embodiments. As shown, system 100 comprises a provider network 102 at which a plurality of network-accessible services may be implemented on behalf of various clients 120. The services of the provider network may include, among others, a virtualized computing service (VCS) 132 as well as a number of storage-related services including a block-device storage service 160 (which provides storage volumes via a block-device level programmatic interface) and an object storage service 170 (which exposes a web-service interface for accessing unstructured storage objects) in the depicted embodiment. A number of security-related services, including a hardware security module (HSM) appliance service 150 may also be supported at the provider network in various embodiments. Some of the services may utilize other service to fulfill client requests—e.g., at least a portion of the persistent storage used for guest virtual machines of the virtualized computing service may be obtained via one or more of the storage services in the depicted embodiment, security keys associated with the virtualized computing service may be stored at the HSM service, and so on.

The VCS 132 may comprise a virtualization host fleet 145 and a control plane fleet 140 in the depicted embodiment. Virtualization hosts 134 of the host fleet 145 may be employed to instantiate guest virtual machines (GVMs) 138. For example, virtualization host 134A may comprise GVMs 138A and 138B, while virtualization host 134B comprises GVM 138K. The GVMs may be utilized by clients 120 to run a variety of applications, some of which may involve the use of resources of other services of the provider network 102, and/or may involve the use of resources outside the provider network 102. At least some of the virtualization hosts 134 may comprise a respective partially-offloaded virtualization manager (PVM) 136 in the depicted embodiment. For example, host 134A comprises PVM 136A, host 134B comprises PVM 136B, and so on. As discussed above, in scenarios in which PVMs are used, the overall responsibilities for managing the administration of local guest virtual machines 138 of the virtualization host 134 may be split among an opportunistic hypervisor (which uses the primary CPUs of the virtualization host) and one or more other virtualization management components which may run on processors mounted on offload cards (such as PCI-E cards or other cards connected via peripheral interconnects).

The PVM approach may be designed to reduce virtualization management workload which consumes resources (such as the main CPUs and main memory) of the virtualization hosts that could instead be deployed for client-requested GVMs. In various embodiments, virtualization management tasks such as network protocol processing (e.g., with respect to encapsulation protocols being used at the VCS) and even memory allocation for the guest virtual machines may be performed entirely or primarily at the offloaded virtualization manager components as discussed below. The CPU usage and memory footprint of the hypervisor itself may be minimized in various embodiments—e.g., most or all of the hypervisor subcomponents may remain quiesced or idle by default, performing virtualization management tasks primarily if and when physical CPUs are relinquished by the guest virtual machines 138. As a result of the default-quiesced mode of hypervisor behavior, in which GVMs are (except under exceptional circumstances) allowed to consume physical CPU cycles for as long as needed without being interrupted by the hypervisor, the variation in the performance of various application operations may be reduced. A secure multi-phase boot procedure may be employed for the virtualization manager components themselves, involving a combination of security keys, TPM measurements and the like. Chain loading and/or live updates of various PVM components may be supported, with the overall goal of avoiding reboots of the guest virtual machines when virtualization manager components need to be replaced or upgraded. It is noted that at least in some embodiments, not all the virtualization hosts of fleet 145 may utilize partially-offloaded virtualization managers. For example, some hosts may comprise respective administrative virtual machines and/or full-fledged non-opportunistic hypervisors, and may not include offload cards which can be used to divert virtualization management processing away from the primary CPUs.

The control plane fleet 140 of the VCS may comprise a number of subcomponents in the depicted embodiment, including for example host identity managers 172, placement managers 174, monitoring managers 176 and the like. The host identity managers 172 may enroll the virtualization hosts 134 within a public-key infrastructure of the VCS 132 in the depicted embodiment, so that the security of the communications between the host and various other components of the provider network 102 is enhanced. The placement managers 174 may be responsible for determining exactly which virtualization host(s) are to be used to fulfill a given client's request for one or more GVMs 138. In some cases, virtualization hosts may be used in a multi-tenant mode, with GVMs of several different clients instantiated on a single virtualization host, while in other cases, at least some of the hosts may be dedicated to GVMs of a single client (single-tenant mode). Monitoring managers 176 may collect various metrics (e.g., performance measurements, health state indicators and the like) associated with individual GVMs 138 and/or hosts 134, including metrics which may be initially obtained by subcomponents of the hypervisor and/or by the offloaded virtualization manager components.

The VCS 132 may implement a set of client-facing programmatic interfaces 160 (e.g., application programming interfaces or APIs, web-based consoles, command line tools, graphical user interfaces and the like) enabling clients 132 to submit requests to acquire, release and interact with guest virtual machines 138 in the depicted embodiment. For example, the equivalent of a "launchGVMs" request or command may be used to instantiate one or more GVMs 138 with specified characteristics, and the equivalent of a "terminateGVMs" command or request may be used to disable one or more of the client's GVMs. In general, a client request, received at a control plane component of the VCS 132 may be transformed into an internal format and transmitted to the PVM at the appropriate virtualization host for implementation. Within the PVM itself, in some embodiments an offloaded component may first receive the internal command/request, passing some version of the command/request on to the opportunistic hypervisor (e.g., using an asynchronous queue-based protocol so as not to interrupt the use of the host resources by GVMs) for implementation if necessary. Details of various aspects of various low-overhead secure virtualization management techniques which may be employed at a VCS 132 are provided below.

Example Virtualization Host Components

Figure 2:
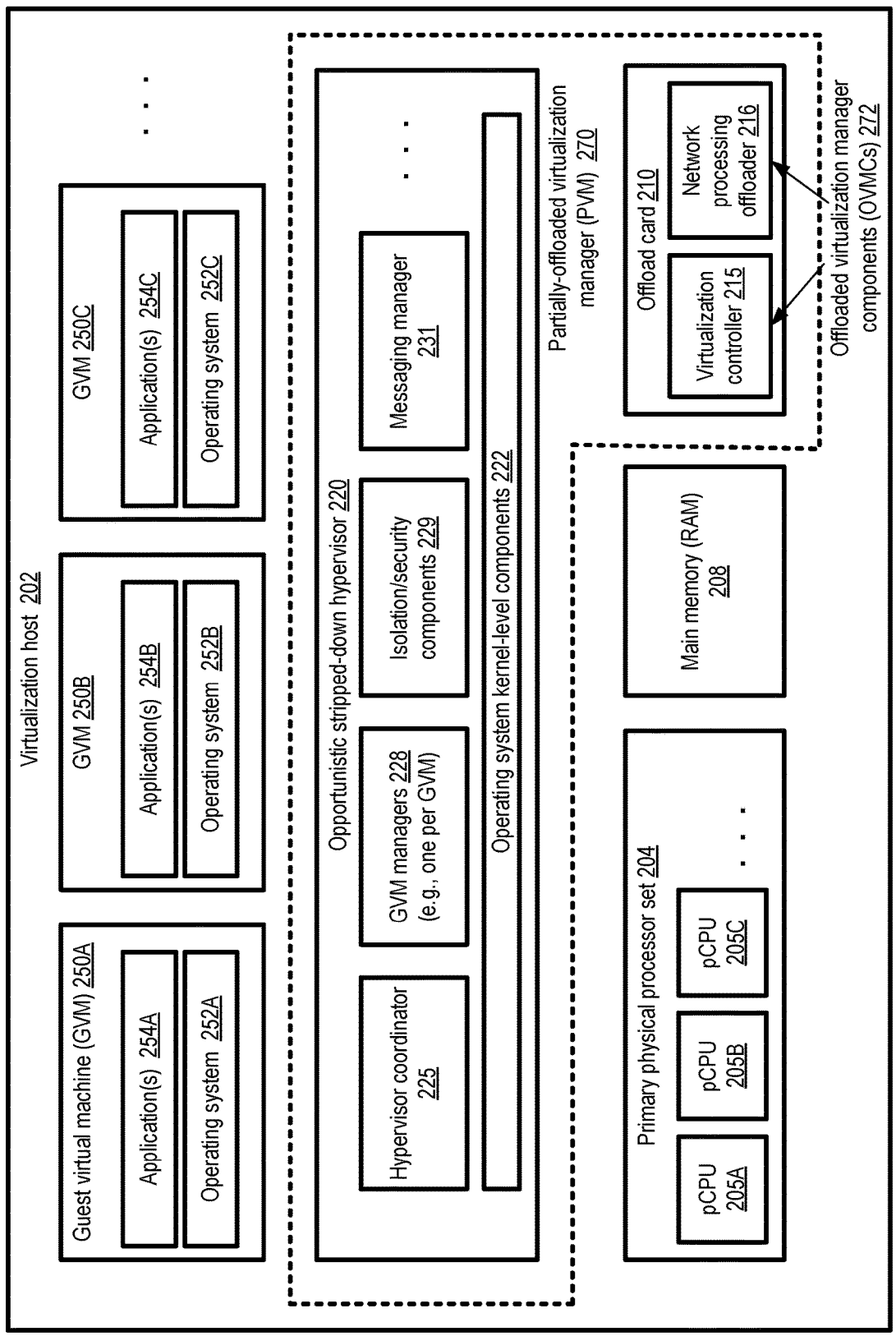
FIG. 2 illustrates example components of a virtualization host, according to at least some embodiments.

FIG. 2 illustrates example components of a virtualization host, according to at least some embodiments. As shown, a virtualization host 202 may comprise a primary physical processor set 204, a main memory (e.g., one or more modules of random access memory or RAM) 208, a partially-offloaded virtualization manager (PVM) 270 and zero or more guest virtual machines GVMs 250, such as GVMs 250A-250C. (Virtualization host 202 may also comprise a number of other components, e.g., various persistent storage devices, which are not shown in FIG. 2 to avoid clutter.) The primary physical processor set 204 may comprise a number of physical CPUs (pCPUs), including pCPUs 205A-205C in the depicted embodiment. Virtualized versions of the pCPUs, called vCPUs or virtual CPUs, may be allocated to individual GVMs by the PVM 270 during the lifetime of the GVMs. Each GVM 250 may comprise a respective instance of an operation system (e.g., operating systems 252A-252C) and a set of applications (e.g., 254A-254C) being run on behalf of clients of the virtualized computing service.

The PVM 270 may comprise an opportunistic stripped-down hypervisor 220 (which uses the pCPUs) and one or more offloaded virtualization manager components (OVMCs) 272 which do not use the pCPUs in the depicted embodiment. OVMCs 272 may include, for example, a virtualization controller 215 and a network processing offloader 216. Individual ones of the OVMCs may be implemented using a respective system-on-chip design in some embodiments. Although both OVMCs 272 are shown as being incorporated within a single offload card 210 (e.g., a PCI-E card) in the depicted embodiment, other approaches regarding the arrangement and organization of the OVMCs may be employed in different embodiments. For example, in one embodiment, a single system-on-chip implementation may be used to perform the functions of the virtualization controller and the network processing offloader, thereby eliminating the need for two different OVMCs. In another embodiment, respective offload cards may be used for the virtualization controller 215 and the network processing offloader 216. The virtualization controller, as suggested by its name, may be responsible for organizing or orchestrating much of the virtualization management work performed at the host 202 in the depicted embodiment—e.g., it may be the first of the components of the PVM to boot as discussed below, trigger the launches of the other components of the PVM, communicate with the VCS control plane, make memory allocation decisions with respect to guest virtual machines, and so on. The network processing offloader 216 may be responsible for implementing one or more networking protocols (including for example an encapsulation protocol used within the VCS) and acting as an intermediary between the GVMs and networking endpoints outside the virtualization host in the depicted embodiment.

Hypervisor 220 may be described as being stripped-down in the depicted embodiment because much of the work performed by at least some conventional hypervisors may be handled by the OVMCs 272 instead, thereby reducing the complexity and size of the hypervisor 220. In addition, hypervisor 220 may be designated as opportunistic because, under most circumstances, it may wait until a GVM voluntarily relinquishes control of a pCPU 205 before the hypervisor uses CPU cycles. Thus, for example, when a particular GVM 138 issues an I/O request (where the I/O is expected to take approximately time T1 to complete) and gives up a pCPU until a response to the I/O request is received, the hypervisor may make use of this opportunity to use the pCPU to perform one or more virtualization management tasks (which may typically take time T2, where T2<<T1) while the GVM is not expecting to use the pCPU. As such, the hypervisor 220 may have a minimal impact on the performance of applications 254 in the depicted embodiment.

The hypervisor 220 may itself comprise a number of subcomponents in the depicted embodiment, including a set of operating system kernel-level components 222, a hypervisor coordinator 225, one or more GVM managers 228, isolation/security components 229, and/or a messaging manager 231. The hypervisor coordinator 225, individual ones of the GVM managers 228, the isolation/security components 229 and/or the messaging manager 231 may be implemented as respective user-mode processes in at least some embodiments. In various embodiments, at least some of these components may be implemented as instances of respective statically linked programs, communicating with one another via pipes using simple, specialized protocols. The subcomponents of the hypervisor may remain passive or quiesced by default in the depicted embodiment, reacting and activating only in response to events (such as messages from other subcomponents, context switches initiated by GVMs, etc.). In some implementations, for example, several of the hypervisor subcomponents may typically remain blocked on a polling system call (such as epoll( ) or the equivalent) most of the time.

The kernel-level components 222 may provide support for various low-level operations such as the initial responses to VM exit instructions issued by the GVMs (e.g., when a GVM gives up a pCPU). The hypervisor coordinator 225, as implied by the name, may be responsible for orchestrating operations of the other subcomponents. The hypervisor coordinator 225 may, for example, implement an API which can be used for communications between the OVMCs 272 and the hypervisor, initiating GVM launches and terminations (e.g., at the request of an OVMC), exposing metrics collected by the GVM managers, providing debugging capabilities, and so on.

Each GVM manager 228 may be responsible for launching or instantiating a respective GVM based on a specification provided by the coordinator 225, monitoring metrics and logs of the GVM, and so on. In some embodiments a GVM manager 228 may also help with GVM-requested I/O operations for certain devices, e.g., by trapping GVM I/O requests and translating them to memory-mapped I/O operations completed with the help of an OVMC. In at least some embodiments, in accordance with the security-related principle of least privilege, a GVM manager 238 may drop many of its own privileges as soon as possible during the instantiation of a GVM. For example, after one or more vPCU (virtual CPU) threads have been spawned for a GVM, and the GVM's memory has been mapped, the GVM manager may disable some of its privileges to reduce the opportunity for security breaches. In one embodiment, a GVM manager 228 may check whether random samples of GVM memory are zeroed as expected (instead of checking the entire GVM memory at one time), thereby increasing the speed of bringing up GVMs. In some embodiments there may be a 1-to-1 mapping between GVM managers and GVMs, while in other embodiments a single GVM manager may be responsible for multiple GVMs.

The messaging manager 231 may act as an intermediary between the virtualization controller 215 and the hypervisor, e.g., by translating commands issued using a queue-based protocol by the virtualization controller into pipe messages within the hypervisor. The security and isolation components 229 may be responsible, for example, for scrubbing or cleaning up GVM memory when a GVM terminates, so that inadvertent sharing of data across GVMs can be avoided. It is noted that the PVM may comprise additional components (not shown in FIG. 2) in at least some embodiments, while in at least one embodiment one or more of the PVM components shown in FIG. 2 may not be required.

Example Offload Card Components

Figure 3:
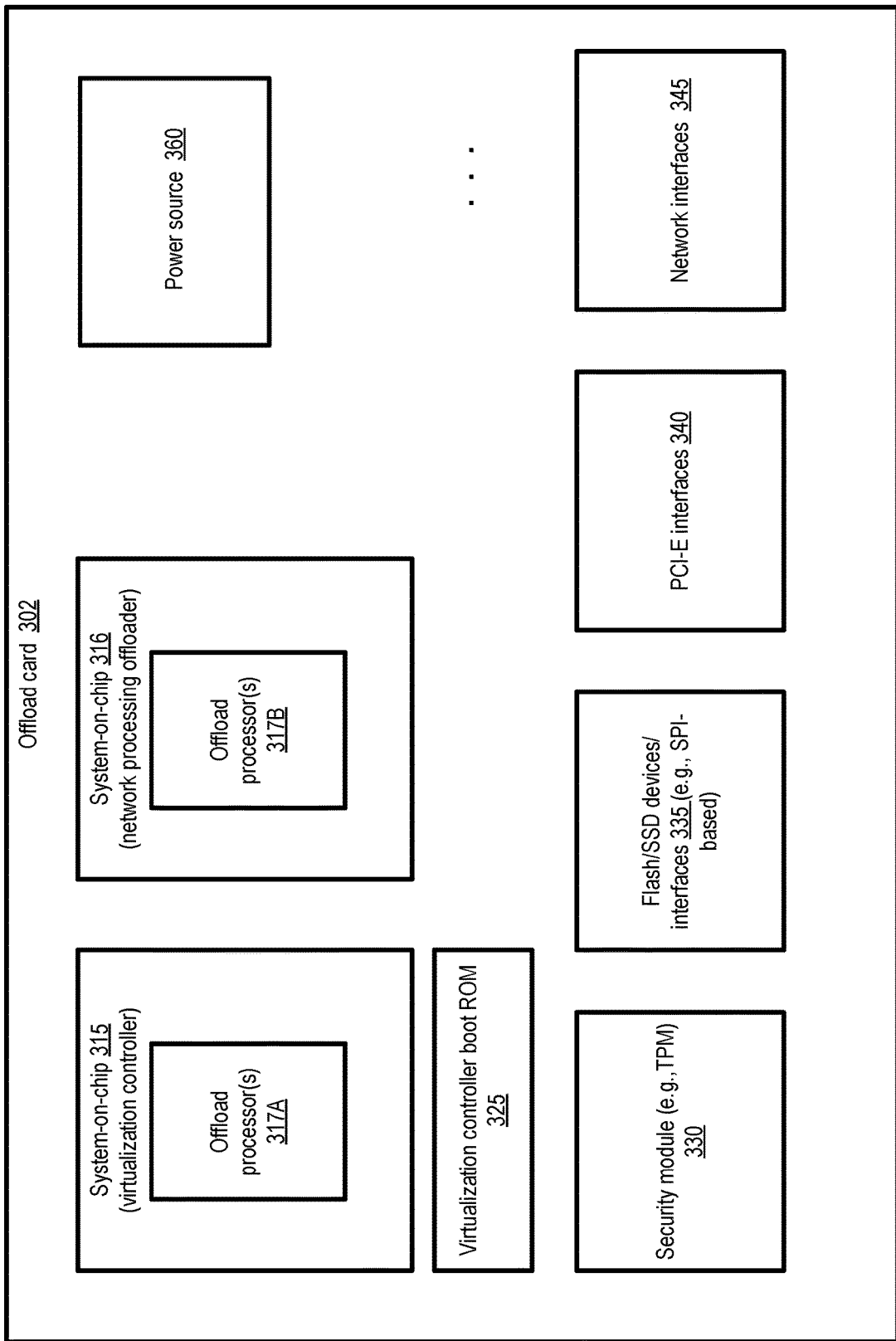
FIG. 3 illustrates example components of an offload card which may be for a subset of virtualization manager components at a host, according to at least some embodiments.

FIG. 3 illustrates example components of an offload card which may be for a subset of virtualization manager components at a host, according to at least some embodiments. As shown, offload card 302 may comprise a pair of systems-on-chip (SOCs) 315 and 316 with respective sets of offloading processors 317A and 317B (as distinguished from the primary pCPUs of the virtualization host discussed above). One of the SOCs (e.g., 315) may be used for the virtualization controller, while the other may be used for the network processing offloader in the depicted embodiment. A secure boot ROM 325 may be used for an initial phase of a multi-phase boot operation by the virtualization controller, as discussed below in further detail. The offload card 302 may also include a security module (such as a trusted platform module (TPM)) 330, which may also be used extensively during the boot procedure and/or for post-boot state verification; example subcomponents of a TPM are shown in FIG. 4.

In addition, the offload card 302 may comprise a number of storage, power and connectivity-related components in various embodiments. For example, one or more flash devices/interfaces (or SSDs) 335 may be incorporated within the offload card. These devices may be used, for example, to store firmware and/or software corresponding to various virtualization management components, guest virtual machine components, and the like. PCI-E interfaces 340 may be used for communicating with the hypervisor and/or for communication among the SOCs in various embodiments. In other embodiments, other types of interconnects and corresponding interfaces may be used, such as variants of the QuickPath interconnect (QPI) or the UltraPath interconnect (UPI). Network interfaces 345 may be used for communications between the virtualization manager and the control plane of the virtualized computing service in some embodiments, as well as for data-plane communications between the guest virtual machines and various network endpoints in at least one embodiment. The offload card 302 may also comprise a power source 360 in some embodiments, e.g., sufficient to keep the OVMCs working for at least some targeted number of hours or days in the event of extended power failures. In some implementations, a supercapacitor-based power source may be used.

Separate SOCs on the same card may not be required for the offloaded virtualization manager components in some embodiments. For example, a single SOC capable of performing the virtualization controller functions as well as network offloading tasks may be utilized in one embodiment. In other embodiments, a separate card may be used for performing network processing tasks than is used for the virtualization controller. The set of offload card components shown in FIG. 3 is not intended to be comprehensive; several other components, such as timers and the like, may be incorporated at the card in some embodiments. In various implementations, at least some of the components shown in FIG. 3 may not be required.

Figure 4:
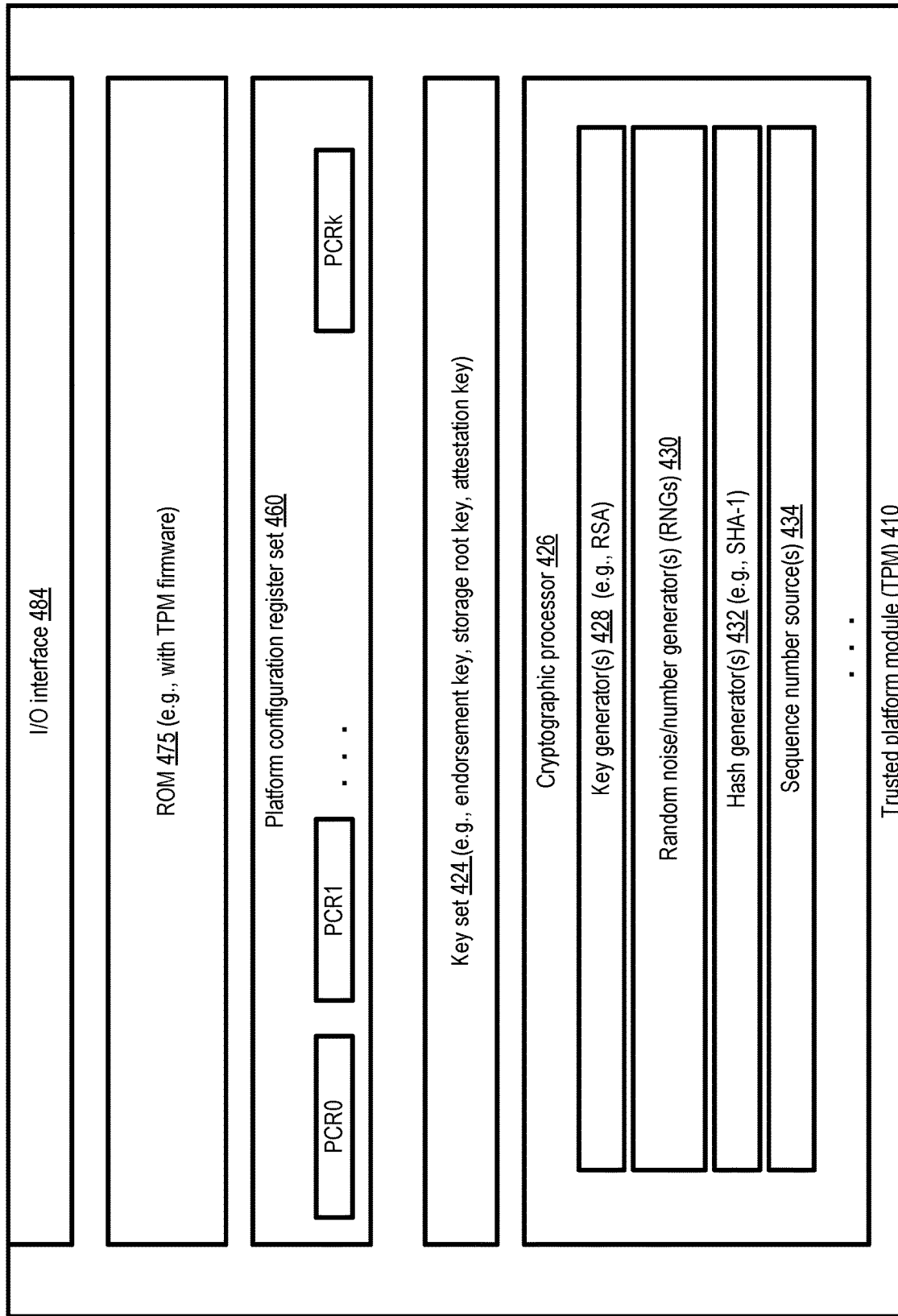
FIG. 4 illustrates example components of a trusted platform module which may be used by a virtualization manager, according to at least some embodiments.

FIG. 4 illustrates example components of a trusted platform module (TPM) which may be used by a virtualization manager, according to at least some embodiments. As discussed earlier, other types of security modules or devices which provide similar functionality, but do not necessarily comply fully with the TPM standards or specifications, may be used in various embodiments. As indicated in FIG. 3, the trusted platform module may be incorporated within an offload card which comprises a virtualization controller in some embodiments; in other embodiments the TPM may be located outside the offload card (e.g., on a separate card reachable via a bus or other interconnect from the virtualization controller, or at a device external to the virtualization host). The requests or commands that are to be implemented using a TPM may be referred to as "trusted computing requests (TCRs)". Generally speaking, a number of different types of TCRs may be supported in various embodiments, including for example requests to validate software/firmware configurations of the virtualization hosts and/or the GVMs, requests to generate and/or store cryptographic artifacts such as hash values or keys, requests to associate or "seal" encrypted values with a corresponding configuration state such that the values cannot be decrypted if the configuration state has changed, and so on. In addition to originating at virtualization manager components as discussed below in the context of a multi-phase boot, TCRs may originate at a number of different layers of the software stack in different embodiments. For example, some TCRs may originate at the application layer of a GVM (or at an external entity communicating with a virtualization host comprising a TPM), and may be translated into specific command sequences transmitted to TPMs from lower levels of software such as virtualization managers. Other TCRs may originate at operating system layers, device driver layers, and so on.

TPM 410 of FIG. 4 may comprise, among other components, an I/O interface 484, a ROM 475, a set of platform configuration registers (PCRs) 470, a key set 424 and a cryptographic processor 426 in the depicted embodiment. A number of different types of communication buses or interconnects may be utilized via I/O interface 484 in different implementations, including, for example, a Low Pin Count (LPC) bus, a PCI-E bus, a Serial Peripheral Interface (SPI) bus, an enhanced Serial Peripheral Interface (eSPI) bus, an Inter-Integrated Circuit (I2C) bus, etc. ROM 475 may be used for TPM firmware in various embodiments.

PCR set 470, comprising a number of individual PCRs such as PCR0-PCRk may be used to store hash signatures corresponding to various configuration elements of the virtualization host. In particular, in various embodiments one or more of the PCRs may be used during the boot of the virtualization manager itself, as discussed below in greater detail. Key set 424 may include, for example, one or more endorsement keys, storage root keys, and/or attestation keys used for various TCRs. An endorsement key may be an encryption key that is permanently embedded in the TPM hardware, generally at the time of manufacture. An endorsement key may not be released outside the TPM in at least some embodiments, and a corresponding public key may be used to verify that the TPM itself is genuine. An endorsement key may also be used to encrypt data; using the corresponding public key, the encrypted version may later be decrypted, and the fact that the decryption was performed at the TPM may thereby be verified. A storage root key may be used to protect a new key created on behalf of an application running at a GVM or at a virtualization manager component in some embodiments, so that the new key cannot be used without the TPM. Unlike endorsement keys, which may be created and stored at the time when the TPM is manufactured, a storage root key may be created when some entity (such as a provider network administrator) takes ownership of the TPM in some implementations. Attestation keys may be utilized in interactions with platform attesters in some embodiments, e.g., to verify that the virtualization host's shared configuration elements meet requirements of the virtualized computing service and/or a client.

A number of different types of cryptographic values may be obtained using the cryptographic processor 426 in various embodiments. For example, cryptographic-strength keys (such as keys associated with the Rivest-Shamir-Adleman (RSA) algorithm or other similar algorithms) may be obtained using key generators 428. Any of several variants of SHA (secure hash algorithm), such as SHA-1, may be used at hash generators 432 to produce hash values that meet desired quality levels. Such hash values may in some cases be used to extend the PCRs during one or more phases of the virtualization manager boot process. High quality random noise values or random numbers may be obtained using RNGs (random number/noise generators) 430 in the depicted embodiment. Monotonically increasing sequence numbers may be obtained from sequence number source(s) 434, and may be used as nonce values or for other applications requiring unique identifiers. Other types of cryptographic functions may also or instead be performed using the TPM in some embodiments. Both symmetric and asymmetric cryptographic engines may be included in a TPM in some embodiments; in other embodiments, either symmetric or asymmetric cryptographic engines may be included instead of both types of engines.

In various embodiments, a TPM may support "sealing" of various data items such as keys (including a key used for later stages of the boot procedure discussed below). When an object such as a key is sealed, the contents of a selected set (or all) of the PCRs may be recorded in TPM as of the time that the request to seal the key is received. Sealed data may only be extracted if and when the selected PCRs have the same value as they had at the time of sealing. In at least one embodiment, a TPM may include GVM-specific sub-components, e.g., in addition to the components shown in FIG. 4 which may be generally used for host-wide rather than GVM-specific TCRs.

Multi-Phase Boot Procedure

Figure 5:
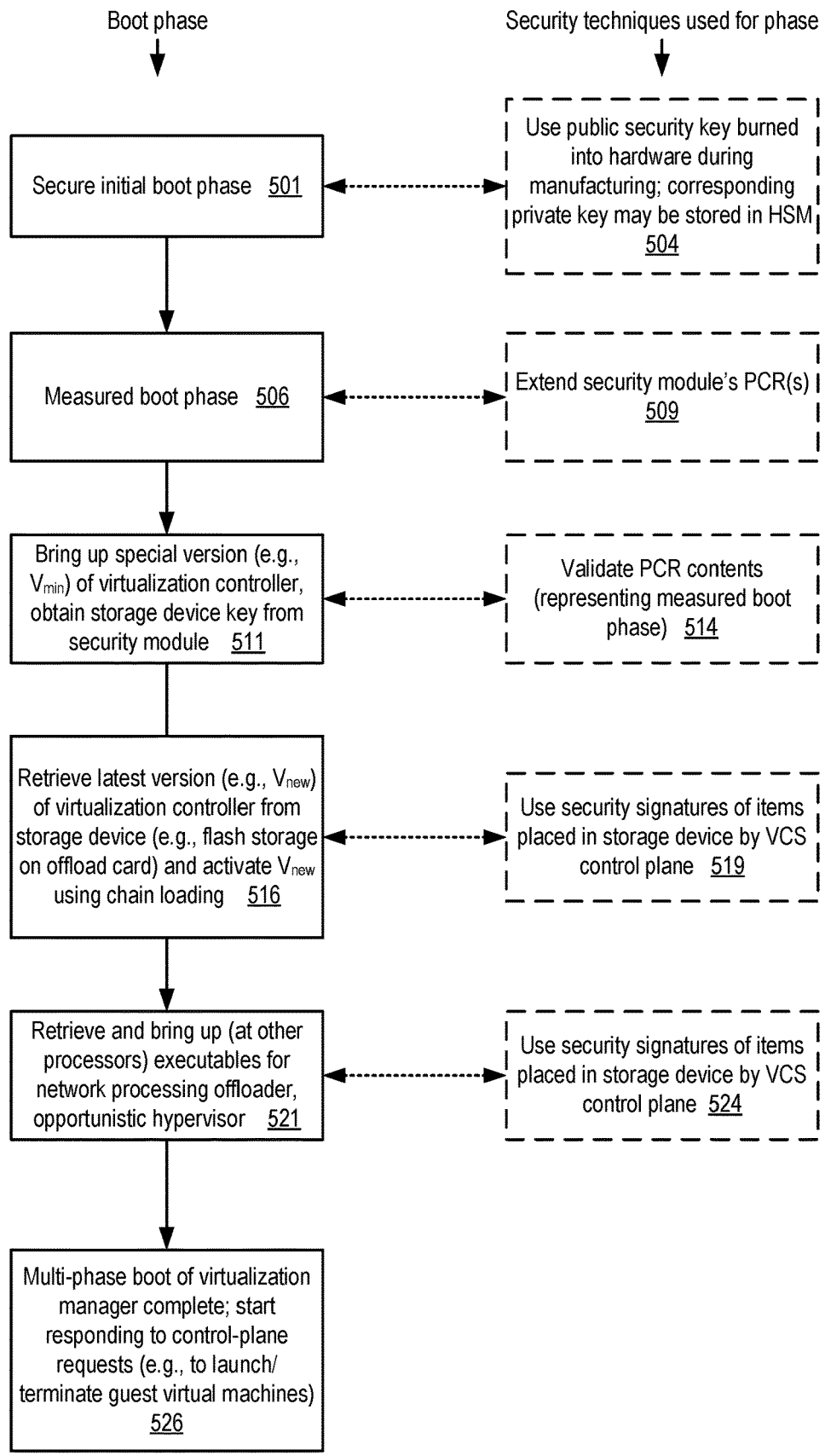
FIG. 5 illustrates aspects of an example multi-phase boot procedure which may be employed for a virtualization manager, according to at least some embodiments.

FIG. 5 illustrates aspects of an example multi-phase boot procedure which may be employed for a virtualization manager, according to at least some embodiments. On the left side of FIG. 5, an overview of the various stages is shown in sequence; on the right side, the primary security techniques used during several of the phases are shown. The multi-stage boot procedure may begin when the virtualization host is powered on in at least some embodiments. In the initial secure boot phase 501, one or more firmware programs may be read in (e.g., from SPI flash storage at the offload card) and executed at an offloading processor or processors (e.g., at the offload card at which the virtualization controller is to run). During this initial (and typically very short) phase, signatures of the firmware may be verified using a public key burnt into the hardware (e.g., at a tamper-resistant or tamper-proof storage location of the offload card, which may or may not be incorporated within a security module such as a TPM). As indicated in element 504, the corresponding private key of the key pair to which the public key belongs may be stored at a hardware security module appliance in at least some embodiments. The firmware used during phase 501 may typically not have to be re-used after the phase completes in the depicted embodiment. In effect, the introduction of firmware that is going to run for a long time or be re-used (e.g., later in the boot procedure and/or post-boot, such as code used for PCI-E configuration space emulation) may represent the start of the second phase of the boot procedure. The firmware used in phase 501 may be expected to remain unchanged during the useful lifetime of the virtualization host in the depicted embodiment, which is one of the reasons why a key burned into hardware may be an appropriate security mechanism for that phase. In contrast, firmware or software used in phases subsequent to phase 501 may be modified (e.g., to introduce enhanced features or to remove bugs) over time.

During the second phase, which is referred to as the measured boot phase 506 in FIG. 5, one or more of the firmware/software programs executed or launched may be used to extend a security module's PCR (or several PCRs) as shown in element 509, thereby leaving precise (and hard to forge) evidence of the programs. For example, in one embodiment a specific PCR, say PCR-k, may be extended three times during measured boot phase, once each for respective firmware programs M1, M2 and M3. Let V0 be the initial value (which may, for example, comprise entirely of zeros) in PCR-k at the start of phase 506. Just before M1 is loaded and executed, the security module may calculate the value of a hash function H which takes V0 and M1 as input (e.g., using a hash generator 432 shown in FIG. 4 or the equivalent), and store that value in PCR-k. Thus the new value of PCR-k may be set as follows: PCR-k←F H(V0, M1). Next, when M2 is loaded, the hash function output taking the current value of PCR-k and the new program M2 may be stored in PCR-k, as follows: PCR-k←F H(H(V0, M1), M2). Similarly, PCR-k may be extended again by M3 when M3 is to be loaded, so that the final value of PCR-0 is set as follows: PCR-k←F H(H(H(V0,M1), M2), M3). As a result, assuming cryptographic-strength hash functions are used, a cryptographic-strength representation of all the programs and the sequence in which the programs were activated may be stored at the security module. The PCR values, which may be termed "measurements" of the firmware/software being loaded, may be made accessible via the security module's I/O interface in various embodiments, and so may be used to verify that the expected versions of the programs were used.

At or towards the end of the measured boot phase, a special minimal version of the virtualization controller (which may be denoted as Vmin herein) may be loaded and launched in the depicted embodiment, as indicated in element 511. Since measurements of the various programs may be stored by extending one or more PCRs, this means that a PCR (e.g., PCR-k in the above example) would contain a hash value based at least in part on the contents of Vmin. The primary purpose of the minimal version may comprise providing a common baseline with just enough functionality to allow more full-fledged versions of the virtualization controller to be launched (e.g., via chain loading) over time. Chain loading is a technique used to replace a currently executing program by a new program, e.g., using a common data area to pass information between the currently executing program and the new program. To ensure that the earlier phases of the boot procedure (prior to updating to a new full-fledged version of the virtualization controller) were performed without a security breach, the contents of the PCR(s) may be checked before the chain loading is initiated, as indicated in element 514. Consider an example scenario in which a full-fledged version V4 of the virtualization controller is to be installed, say on June 1 of a particular year. Later, say on December 1, version V5 is to be installed. In both cases, the first three phases (up to the starting up of Vmin, the special minimal version of the virtualization controller) may be identical (assuming no firmware programs for those stages were changed), so the same values may be stored in the TPM PCRs when Vmin is brought up, and the fact that nothing has changed in the earlier phases of the boot may be verified by reading the contents of the PCRs. In the June scenario, Vmin may be replaced via chain loading by V4, while in the December scenario, Vmin may be replaced directly by V5 (e.g., without having to pass through V4 or other intermediate versions).

The new version (e.g., Vnew) of the virtualization controller may be stored at an encrypted storage device (e.g., a flash-based device or an SSD) accessible from the offload card in at least some embodiments. In order to decrypt Vnew, a key may have to be obtained by Vmin from the security module (as indicated in element 509). In the depicted embodiment the security module may only provide the key if the PCR state represents the successful and secure completion of the earlier phases of the boot, such as the measured boot phase. Thus, if somehow the earlier phases of the boot were attacked and breached, the PCR values would not match the expected values, and the live update to Vnew may be blocked in at least some embodiments. In some embodiments, the same key that was used in operations corresponding to element 501 may be used for the storage device, while in other embodiments a different key may be used.

As indicated in element 516, the new version Vnew of the virtualization controller may be retrieved from the encrypted storage device using the key obtained from the security module in the depicted embodiment. Additional components of the virtualization manager (whose executable versions may also be retrieved from the encrypted storage devices) may then be launched by the full-fledged version Vnew of the virtualization controller (element 521). As discussed earlier, at least some of these additional components (such as the hypervisor and/or the network processing offloader) may run on a processor other than the processor(s) used for the virtualization controller itself. The executable versions of these components may be signed by control plane components of the virtualized computing service before they are written to the encrypted storage device in various embodiments. The signatures of each of the components may be checked using a public key infrastructure into which the virtualization host is enrolled, as indicated in elements 519 and 524. A procedure for enrolling the host in such an infrastructure is discussed below in the context of FIG. 7.

After all the components of the virtualization manager (such as the virtualization controller Vnew, the network processing offloader, and subcomponents of the opportunistic hypervisor discussed in the context of FIG. 2) have been instantiated successfully, the multi-phase boot may be considered complete (element 526). At least in some embodiments one or more of the hypervisor subcomponents may place themselves in a quiescent state as discussed earlier. The virtualization manager may then begin processing GVM-related requests, such as requests to instantiate/launch GVMs, terminate existing GVMs, validate the software/firmware state of the host, and so on.

Initial Key Generation for Encrypted Storage Device

Figure 6:
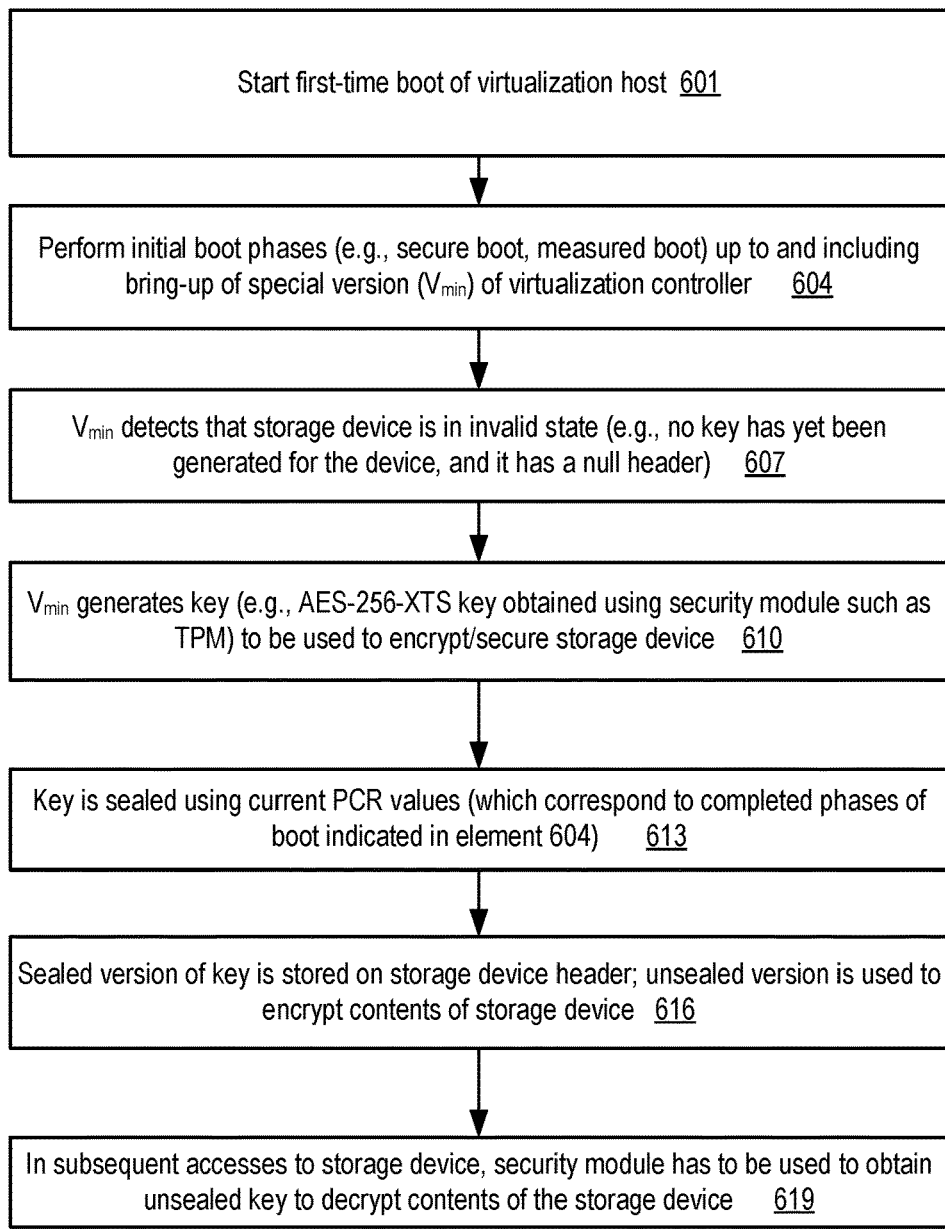
FIG. 6 is a flow diagram illustrating aspects of operations which may be performed to enhance the security of a storage device used for executable programs associated with a virtualization manager, according to at least some embodiments.

FIG. 6 is a flow diagram illustrating aspects of operations which may be performed to enhance the security of a storage device used for executable programs associated with a virtualization manager, according to at least some embodiments. Such programs may include, among others, the full-fledged versions of the virtualization controller (referred to as Vnew above), hypervisor versions and/or network processing offloader versions. A TPM is used as the security module in the embodiment depicted in FIG. 6, although other types of security modules may be employed in various embodiments. As shown in element 601, a first time boot of the virtualization host (e.g., the very first time the virtualization host is booted after it is installed in a data center after manufacturing and testing) may be initiated. The first few boot phases shown in FIG. 5 may be performed (e.g., the first boot phase secured using a burned-in key, and the measured boot phase), up to and including the launch of Vmin (element 604).

Vmin may then attempt to check whether the storage device is in a valid state, e.g., by examining the contents of a header portion of the storage device. If the header is null (or has some other value which indicates that an encryption key for the storage device has not yet been generated), this may indicate that the storage device is in an invalid state (element 607). Vmin may then generate an encryption key (e.g., a key conformant with an Advanced Encryption Standard such as AES-256-XTS) for the storage device using the TPM's cryptographic engine (element 610) in the depicted embodiment. This key may then be sealed at the TPM using the current contents of the PCRs (which at this point comprise hash values generated during the phases of the boot process mentioned in element 604) (element 613).

In the depicted embodiment, the sealed version of the key may be placed in a header of the storage device (element 616), where it may serve as an indicator that the storage device has been initialized properly. In subsequent accesses to the storage device (e.g., each time a full-fledged version of the virtualization controller has to be retrieved from the storage device, as in operations corresponding to element 511 of FIG. 5), the unsealed version of the key may be retrieved from the TPM to decrypt the contents of the storage device (element 619).

Virtualization Host Enrollment in VCS Network Security Infrastructure

During its lifetime, each virtualization host may have to communicate securely with various other components of the provider network, such as control plane entities of one or more services including the virtualized computing service itself. In order to do so, in at least some embodiments, the virtualization manager running at the host may be required to enroll or register the host as a member of a public key infrastructure, or some other similar security infrastructure, via network interactions with a host identity management service associated with the virtualized computing service. Such a host identity management service may be implemented using resources within the virtualized computing service in some embodiments (e.g., using one or more of the host identity managers 172 shown in FIG. 1), while in other embodiments the host identity management service may be external to the virtualized computing service. Generally speaking, in various embodiments the host identity management service may be responsible for registering/enrolling virtualization hosts in the security infrastructure, renewing and rotating the resulting certificates as needed, managing a certificate revocation list, and/or maintaining the contents of a respective key store on individual virtualization hosts.

Figure 7:
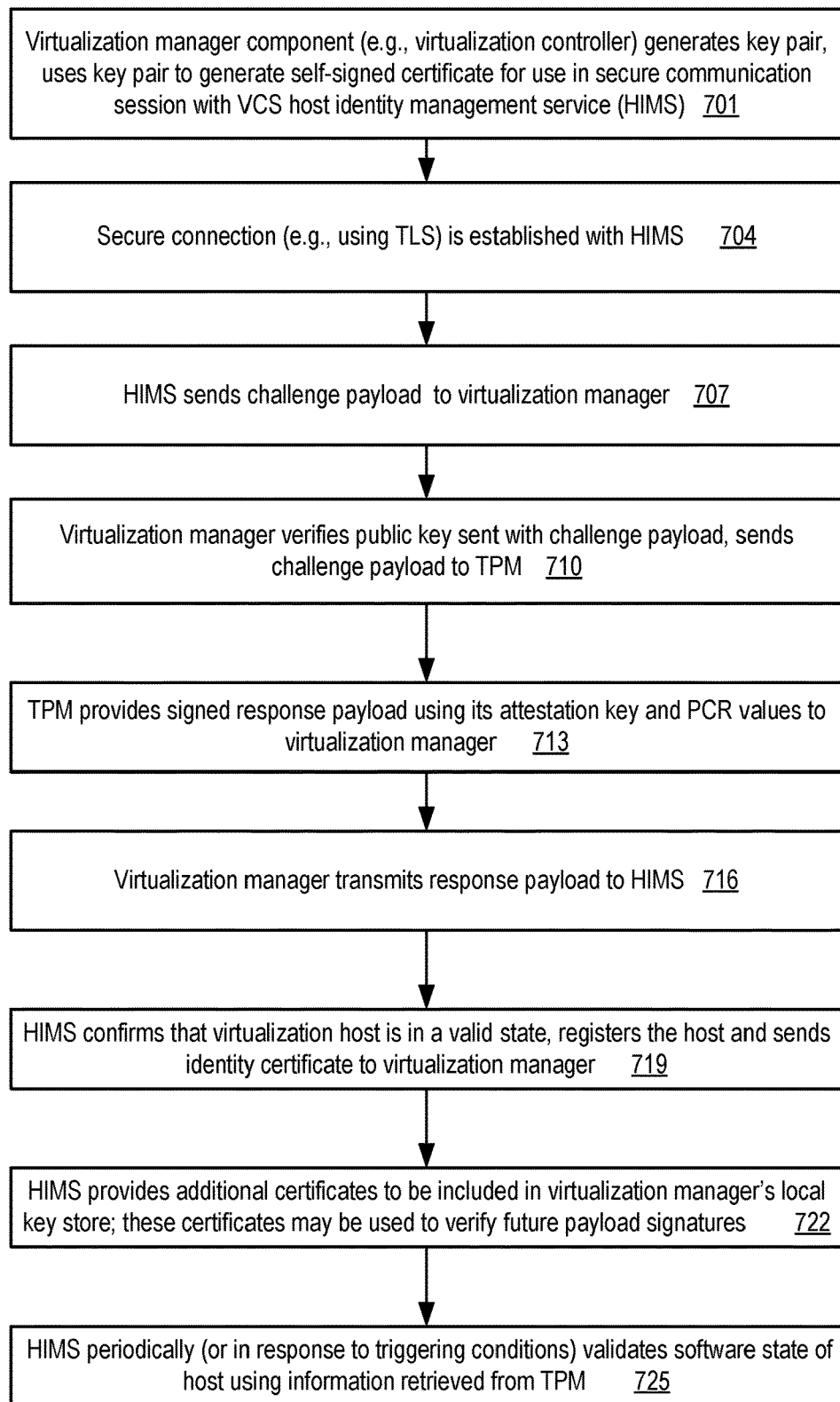
FIG. 7 is a flow diagram illustrating aspects of operations which may be performed to register a virtualization host within a security infrastructure of a virtualized computing service, according to at least some embodiments.

FIG. 7 is a flow diagram illustrating aspects of operations which may be performed to register a virtualization host within a security infrastructure of a virtualized computing service, according to at least some embodiments. As in FIG. 6, a TPM is used as the security module in the embodiment depicted in FIG. 7, although other types of security modules may be used in other embodiments. As shown in element 701, a component of the virtualization manager (such as the minimized version Vmin of the virtualization controller) may begin the registration procedure by generating a security key pair (e.g., using the TPM), and then creating a self-signed certificate for use in a secure communication session with the host identity management service (HIMS). Any appropriate secure/cryptographic networking protocol such as TLS (Transport Layer Security) may be used to establish a connection for the session (element 704). In at least some embodiments, the virtualization controller may be the component of the partially-offloaded virtualization manager which interacts with the HIMS for registration purposes.

The HIMS may initiate its participation in the registration procedure by sending a challenge payload (e.g., comprising some random data, as well as the public key provided for the session by the virtualization manager) to the virtualization manager (element 707). The challenge message may verify the public key and send the challenge payload to the TPM (element 710). The TPM may prepare a response payload, e.g., using an attestation key and the current values of one or more PCRs (element 713), and provide the response payload to the virtualization manager.

In turn, the response payload may be passed on the HIMS by the virtualization manager (element 716). The HIMS may confirm, using the response payload, that the state of the virtualization host is acceptable or valid for registration. The HIMS may then register or enroll the virtualization host, e.g., by generating an X509 identity certificate for the host and sending the identity certificate to the virtualization manager at the host (element 719). The identity certificate may be used to secure at least some subsequent communications from the virtualization host in the depicted embodiment. In some embodiments, the HIMS may also transmit one or more additional certificates to be stored in a local key store (e.g., in the encrypted storage device, or at the TPM) accessible to the virtualization manager (element 722). Such additional certificates may be used by the virtualization manager to verify the signatures of payloads generated for updates of various components (including full-featured versions of the virtualization controller, the opportunistic hypervisor, and/or the network processing offloader). In some embodiments a certificate to be used to verify the signature of virtualization controller versions may be used to extend a PCR of the TPM; that is, this certificate may be measured just as the firmware components in the second phase of the boot procedure discussed earlier were measured.

After the host has been registered and the full version of the virtualization manager has been brought up, various GVM-related operations may be initiated, such as launching/terminating GVMs in response to client requests. To further enhance the security of the virtualized computing service, in at least some embodiments the HIMS or other control plane components of the virtualized computing service may periodically (or in response to triggering conditions) validate the state of the host by sending queries (e.g., attestation queries) to the virtualization manager, or to the TPM via the virtualization manager (element 725). Such a validation query may, for example, comprise a request to identify the version of one or more software/firmware programs for which measurements or other indicators are stored at the TPM. The appropriate validation data may be retrieved from the TPM and provided to the HIMS or other control plane components. If no response is received to such a query, or an unexpected/invalid response is received, the HIMS or other control plane component may trigger an alarm to indicate that the host is in an invalid or breached state in some embodiments, and appropriate remedial actions (such as disabling and debugging the host) may be initiated.

Trust Levels within a Virtualization Host

Figure 8:
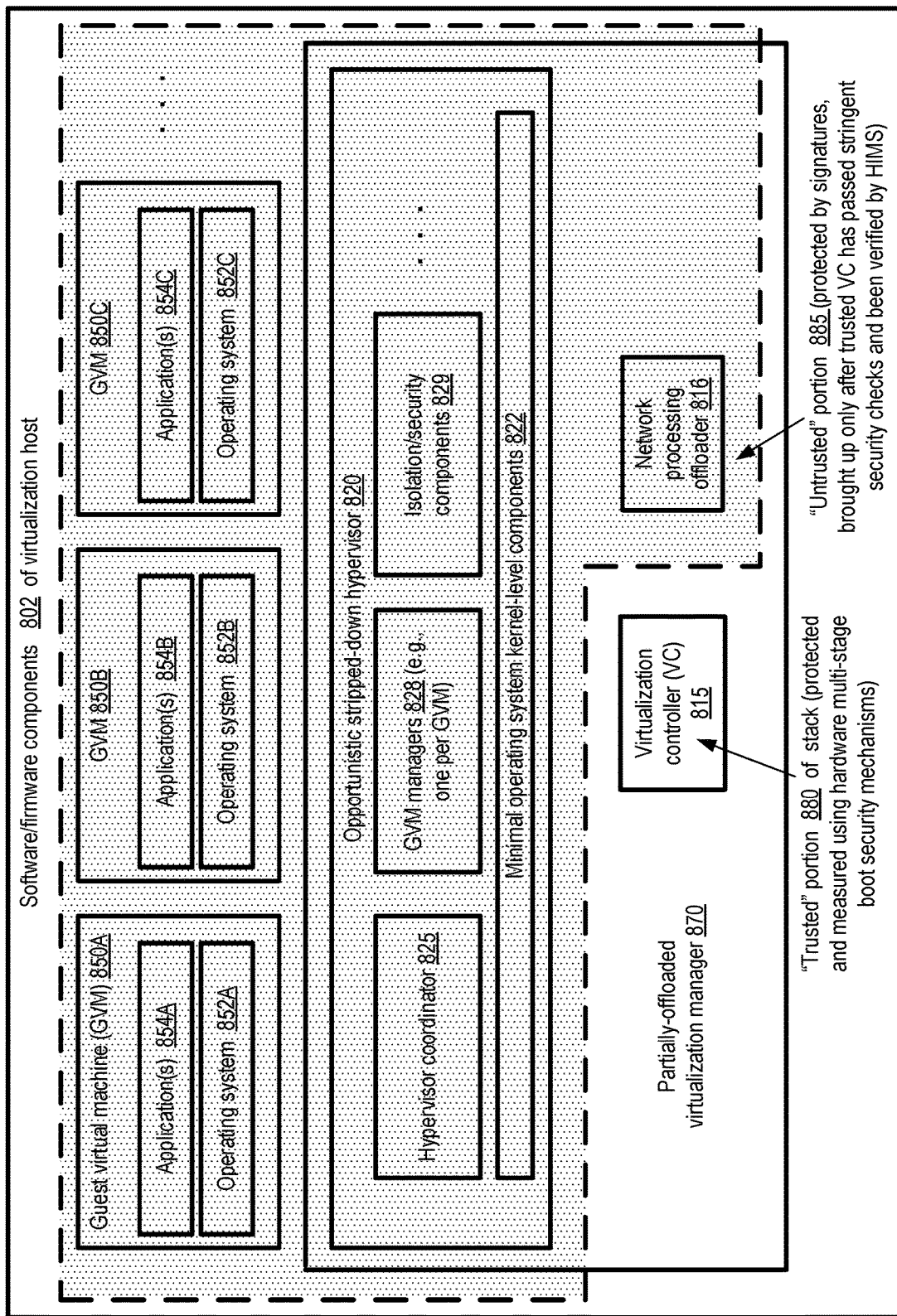
FIG. 8 illustrates examples of different trust levels associated with components of a virtualization host, according to at least some embodiments.

FIG. 8 illustrates examples of different trust levels associated with components of a virtualization host, according to at least some embodiments. As a result of the various techniques described above, including the multi-stage boot process, the use of the encrypted storage device for new versions of virtualization manager components for live updates, the interactions with the host identity management service, and the minimization of the responsibilities of the hypervisor, the chances of undetected security breaches persisting at a virtualization host may be minimized. As indicated by arrow 885 in FIG. 8, most of the software/firmware components 802 which run at the virtualization host, including the stripped-down opportunistic hypervisor 820, the network processing offloader 816, and the guest virtual machines 850 may be considered untrusted from a security perspective. Security attacks directed at individual ones of those components, or bugs introduced into individual ones of those components, would tend to be localized in their impact and would not be able cause any widespread outages, since much of the interactions with security-sensitive portions of the virtualized computing service may be performed by the virtualization controller. Because much of the functionality traditionally handled by hypervisors has been offloaded, the opportunities for security breaches of the hypervisor may be reduced, and the impact of any successful security attacks directed at the hypervisor itself may be minimized.

The virtualization controller may be considered the primary trusted component of the software/firmware stack in the depicted embodiment, as indicated by arrow 880. The probability of persistent successful breaches of the virtualization controller's security may be minimized using the security module's capabilities and the burned-in key for the earliest boot phase as discussed above. Furthermore, the use of live updates for various components of the virtualization manager, and checks on the state of the virtualization host by the host identity management service, may increase the speed with which attacks are detected and the speed with which remedial actions are taken (with minimal impact on running guest virtual machines) when attacks do occur.

Guest Virtual Machine Instantiation

Figure 9:
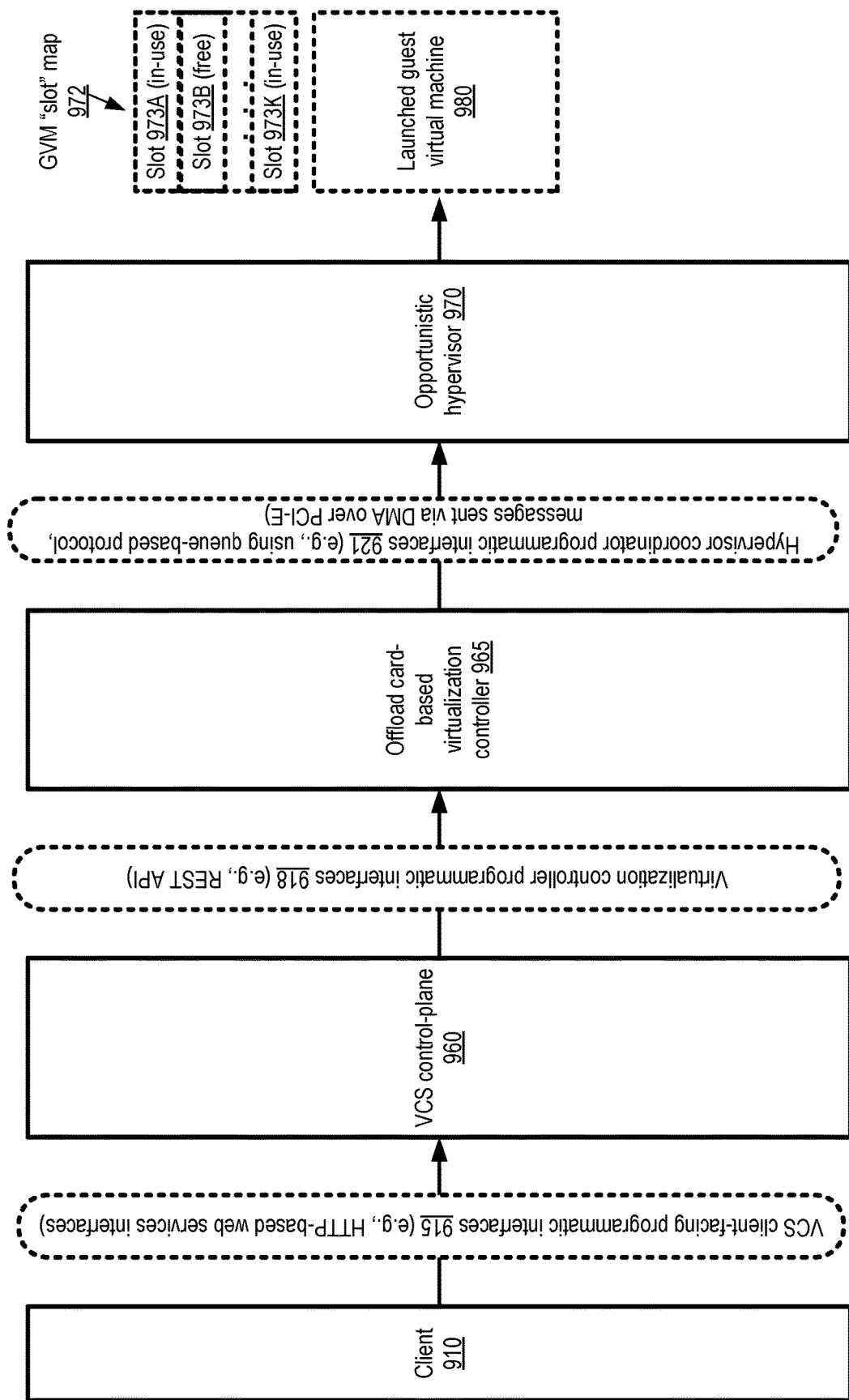
FIG. 9 illustrates examples of interactions which may be required among various layers of virtual computing service components to launch guest virtual machines, according to at least some embodiments.

FIG. 9 illustrates examples of interactions which may be required among various layers of virtual computing service components to launch guest virtual machines, according to at least some embodiments. A client 910 of the service may transmit a request to instantiate or launch a GVM (with the desired characteristics of the GVM, such as the memory size, processing capability level, operating system version, etc. indicated in the request) using the programmatic interfaces 915 of the service (e.g., using secure Hypertext Transfer Protocol-based web services interfaces). The client's request may be received at a control plane component 960, and translated into an internal format for transmission to a selected virtualization host. The particular host may be selected, for example by a placement manager of the control plane, based on the characteristics of the desired GVM, the available resource capacity at the host, and so on. In some embodiments, a REST (Representational State Transfer) application programming interface may be supported by the virtualization controller running at an offload card of the virtualization host. The control plane component may use the virtualization controller's programmatic interface 918 to transmit the internal version of the GVM instantiation request to the virtualization controller 965.

The offload card-based virtualization controller may then format a corresponding request directed at the opportunistic hypervisor 970 in the depicted embodiment. In at least some embodiments, a queue-based protocol may be used to send requests to the hypervisor from the offload card, e.g., using PCI-E based DMA (direct memory access). When the GVM instantiation request is received via the hypervisor's programmatic interfaces 921, the subset of resources of the virtualization host to be dedicated for the host may be identified, and the guest virtual machine may be launched (element 980) using the appropriate machine image. The machine image to be used for the guest virtual machine may be read in from a storage location by one or more virtualization manager components in various embodiments. In some embodiments, each virtualization host may have a number of GVM "slots" 973 (e.g., slots 973A-973K) of slot map 972, with each slot representing the resources used for a given GVM. An in-use slot (such as slot 973A or 973K) may indicate that the corresponding resources are currently allocated to a client, while a free slot may be used for the new GVM. In at least some embodiments, the specific portion of the main memory of the virtualization host which is allocated to a given GVM may be selected by the virtualization controller as discussed below in further detail.

Figure 10:
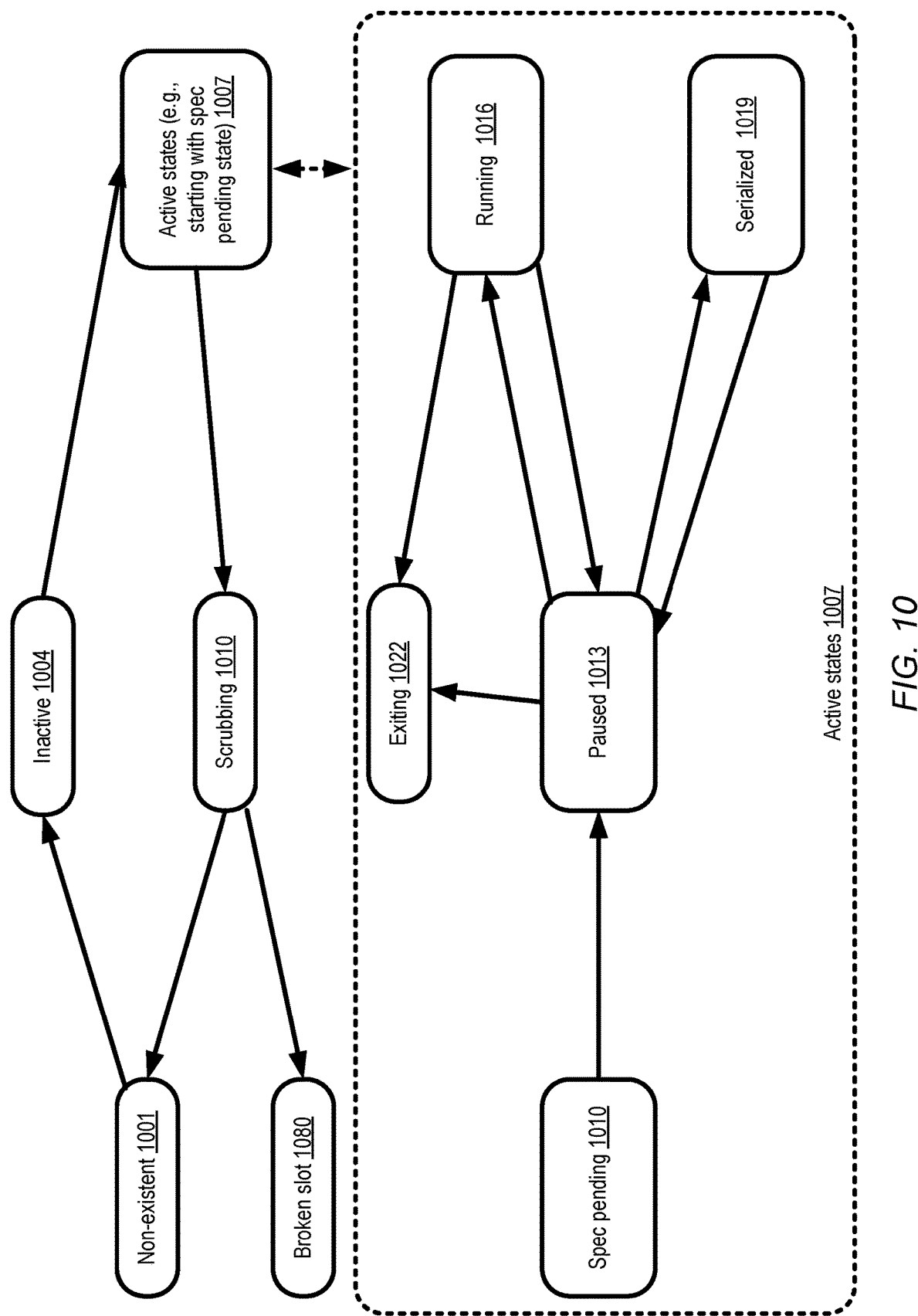
FIG. 10 illustrates example state transitions of a guest virtual machine at a virtualization host, according to at least some embodiments.

FIG. 10 illustrates example state transitions of a guest virtual machine at a virtualization host, according to at least some embodiments. Prior to the instantiation of the GVM using a particular slot of the kind discussed above in the context of FIG. 9, the GVM may be considered to be in a non-existent state 1001. When a slot is allocated for an instance, e.g., by a control plane component of the virtualized computing service acting together with a virtualization manager of the host, the instance may initially be in an inactive state 1004. The GVM may then move to an active state 1007, e.g., an initial "specification pending" state 1010 from which the GVM may transition to several other active states.

In the specification pending state 1010, a GVM manager process of the opportunistic hypervisor may have been assigned for the GVM, but the specification of the GVM (comprising detailed information needed to instantiate the GVM process) may not have been provided yet to the GVM manager process. From the specification pending state 1010, the GVM may pass enter a paused state 1013. In the paused state, the specification may have been provided to the GVM manager, but the virtual CPU threads (vCPUs) of the GVM have not yet been scheduled for execution at a physical CPU (pCPU). The paused state may be used, for example, for debugging purposes and/or to attach/detach devices.

When the vPCUs are made runnable on a pCPU, the GVM may enter running state 1016, and applications of the client may be run using the pCPU. The serialized state 1019 may be reached from the paused state 1013 by storing vCPU state in a region of memory reserved for GVM metadata (to be used during live updates of the hypervisor) as discussed below. From either the serialized state 1019 or the running state, the GVM may be paused, e.g., by the GVM manager component of the hypervisor when required for a live update of the hypervisor. In addition, from the running or paused states, the GVM may enter exiting state 1022 in the depicted embodiment, e.g., when the hypervisor is informed that the GVM is to be terminated, or when an operation to abort a running GVM which appears to be stuck is required. In the case of a planned or requested GVM reboot, the GVM may be placed back in the inactive state (and then the active states) after is restarted in various embodiments.

When a decision is made to terminate a GVM permanently from the virtualization host, the portion of the main memory of the host (as well as other resources) which was allocated for the GVM may have to be scrubbed or cleaned, e.g., to prevent inadvertent transmission of data from the terminated GVM to the next GVM which is to occupy its slot. As such, the GVM may transition from the exiting state 1022 to a scrubbing state 1010, in which a security component of the hypervisor ensures that the memory is overwritten (e.g., with zeroes). If the memory cannot be scrubbed for some reason, the corresponding slot may be considered a "broken slot" 1080, and the control plane of the virtualized computing service may be informed that the slot is not available for new GVMs. In some embodiments, repair operations to make the broken slot's memory available may be initiated. If the scrubbing succeeds, the memory associated with the slot may be reused for a new GVM which begins in the non-existent state 1001.

Memory Management Offloading

In addition to the boot-related and security-related operations discussed above, in at least some embodiments a significant subset of memory allocation tasks at the virtualization host may be performed at offloaded virtualization manager components. In particular, while the opportunistic hypervisor may manage a relatively small portion of the main memory of the virtualization host, allocation decisions regarding the remainder of the memory may be made by the virtualization controller or a separate offloaded memory manager in at least some embodiments. This approach may have the benefit of further reducing the amount of work that has to be done by the hypervisor, thereby enabling more of the pCPU cycles to be utilized by guest virtual machines. In addition, as described below, this approach may also enable live updates of the hypervisor to be performed, during which running guest virtual machines may not have to be rebooted.

Figure 11:
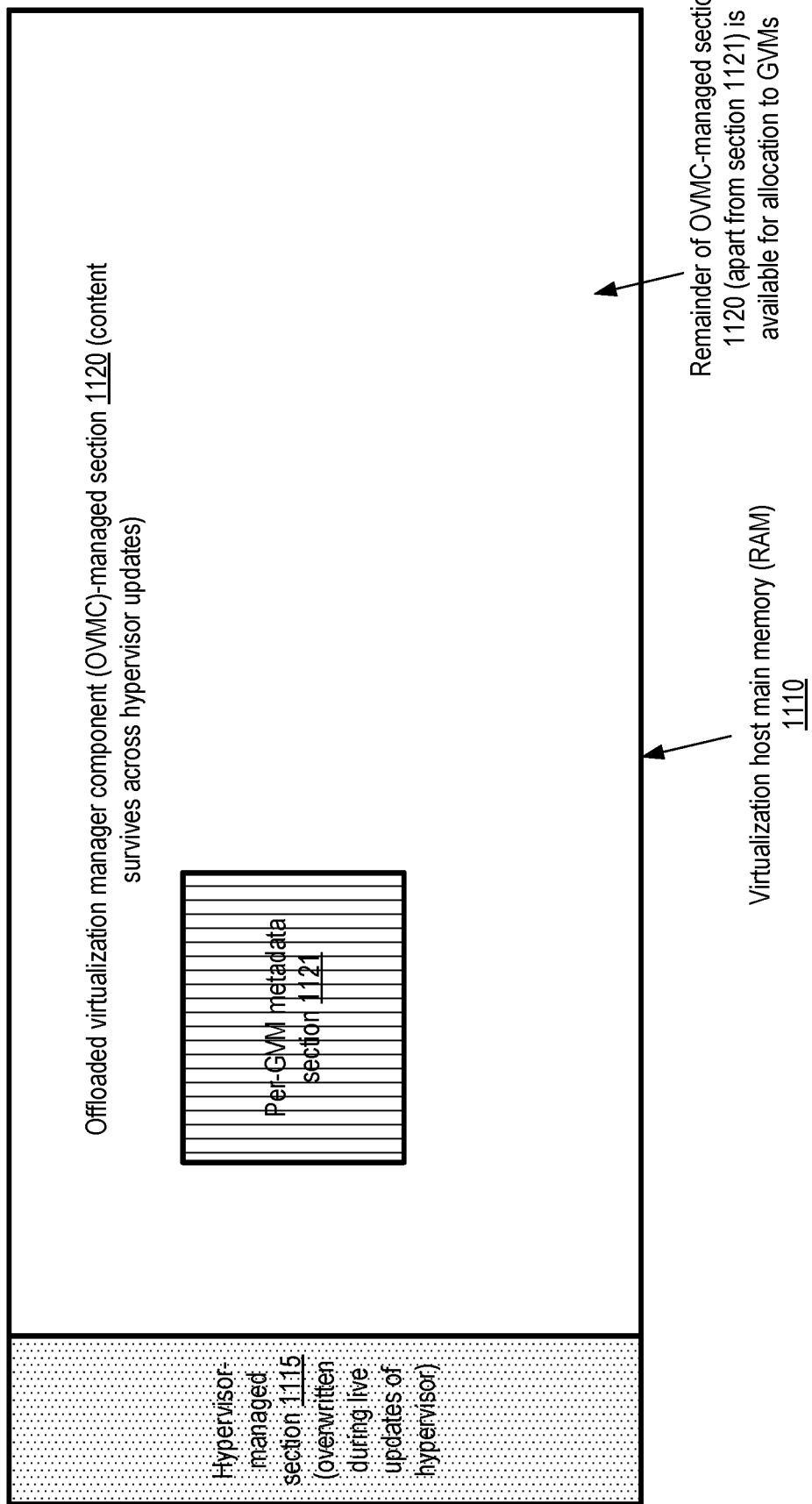
FIG. 11 illustrates an example of a partitioning of a main memory of a virtualization host into a section managed by an offloaded virtualization manager component and a section managed by a hypervisor, according to at least some embodiments.

FIG. 11 illustrates an example of a partitioning of a main memory of a virtualization host into a section managed by an offloaded virtualization manager component and a section managed by a hypervisor, according to at least some embodiments. As shown, the virtualization host's main memory 1110 is divided into a hypervisor-managed section 1115 and a section 1120 managed by an offloaded virtualization manager component (OVMC). The OVMC-managed section may be used for GVM memory allocations in the depicted embodiment, and also for per-GVM metadata 1121 which may be used to store GVM device state during hypervisor updates. At least some of the hypervisor-manages section 1115 may be overwritten during a live update of the hypervisor in the depicted embodiment. In contrast, at least in part because it is not being managed by the hypervisor, the content of the OVMC-managed portion 1120 may survive across hypervisor updates.

Figure 12:
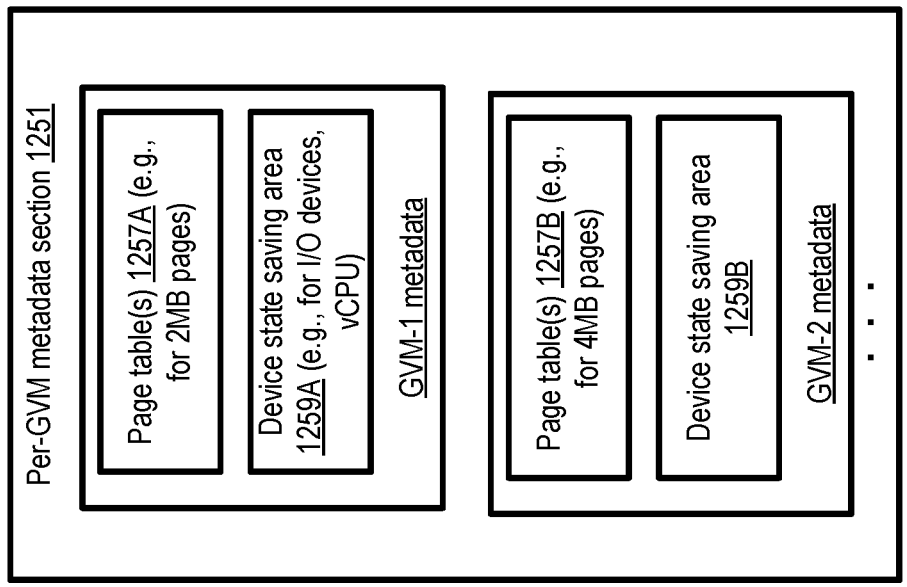
FIG. 12 shows example contents of the hypervisor-managed section of host memory and metadata contained in the memory section managed by an offloaded virtualization manager component, according to at least some embodiments.
Figure 12:
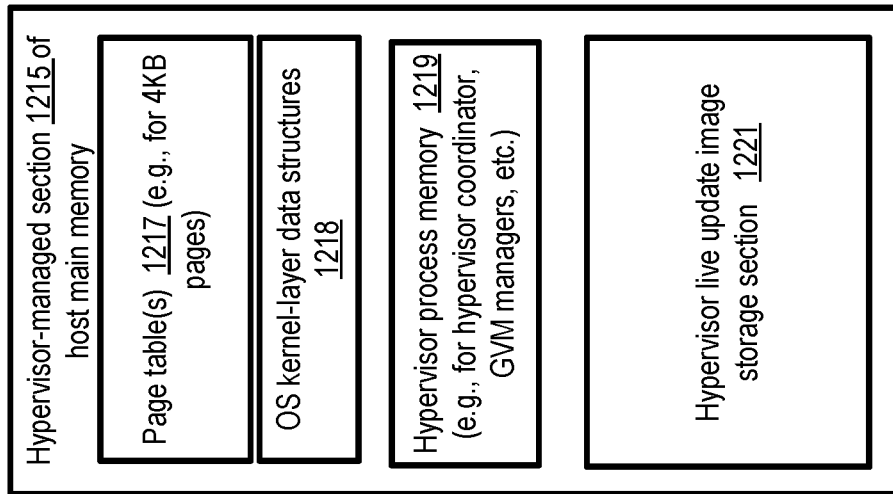

FIG. 12 shows example contents of the hypervisor-managed section of host memory and metadata contained in the memory section managed by an offloaded virtualization manager component, according to at least some embodiments. The hypervisor-managed section 1215 may comprise one or more page tables 1217, data structures 1218 used by the operating system kernel-level components of the hypervisor, hypervisor process memory 1219 such as specific regions of memory allocated to the hypervisor coordinator, GVM managers and the like, as well as a live update image storage section 1221 in the depicted embodiment. The page table 1217 used at the hypervisor may be configured to manage individual allocations of fairly small sizes in some embodiments, such as four-kilobyte or eight-kilobyte pages. When a live update of the hypervisor is performed, the hypervisor may be booted in place using the contents of section 1221. Section 1221 may later be used to store yet another more recently-updated version of the hypervisor. As such, the hypervisor-managed memory section 1215 may comprise two versions of the hypervisor at various points in time—a current version, and a to-be-booted version in section 1221.

The per-GVM metadata section 1251 of the main memory may comprise respective portions of memory for various different GVMs that happen to be instantiated at the virtualization host. Each per-GVM metadata portion may comprise one or more page tables for the GVM and a device state saving area in the depicted embodiment. Thus, for example, GVM1-metadata portion comprises page table(s) 1257A and device state saving area 1259A in the depicted example, while GVM2-metadata portion comprises page table(s) 1257B and device state saving area 1259B. The page sizes of the entries in the GVM-specific page tables 1257 may differ from the page sizes used by the hypervisor in at least some embodiments. For example, the hypervisor may allocate memory from its portion in pages of four kilobytes in one implementation, while the page size used for the GVM may be two megabytes. In at least one implementation, different page sizes may be used for different GVMs on the same host—e.g., GVM1's pages may each be two megabytes, while GVM2's pages may each be four megabytes in size. In various embodiments, the particular sizes of the pages to be used for the hypervisor and the different GVMs may be determined (e.g., by the control plane of the virtualized computing service) based on the expected patterns of memory allocations. The state of a GVM's I/O devices (e.g., one or more pass-through I/O devices), vCPUs and the like may be saved in the state saving area for the GVM in various embodiments, e.g., during short periods in which the GVM is paused when a hypervisor live update is performed. In at least some embodiments, an OVMC may determine which regions of the main memory are to be used for a given GVM (e.g., for the GVM's operating system and applications) and the GVM's metadata, and provide that information to the hypervisor. Thus, while GVM-specific memory allocation decisions may be made by the OVMC, at least some of the results of those decisions may be provided to the hypervisor by the OVMC in such embodiments. It is noted that the page tables and device state saving area for a given GVM may not be contiguous in at least some implementations.

Figure 13:
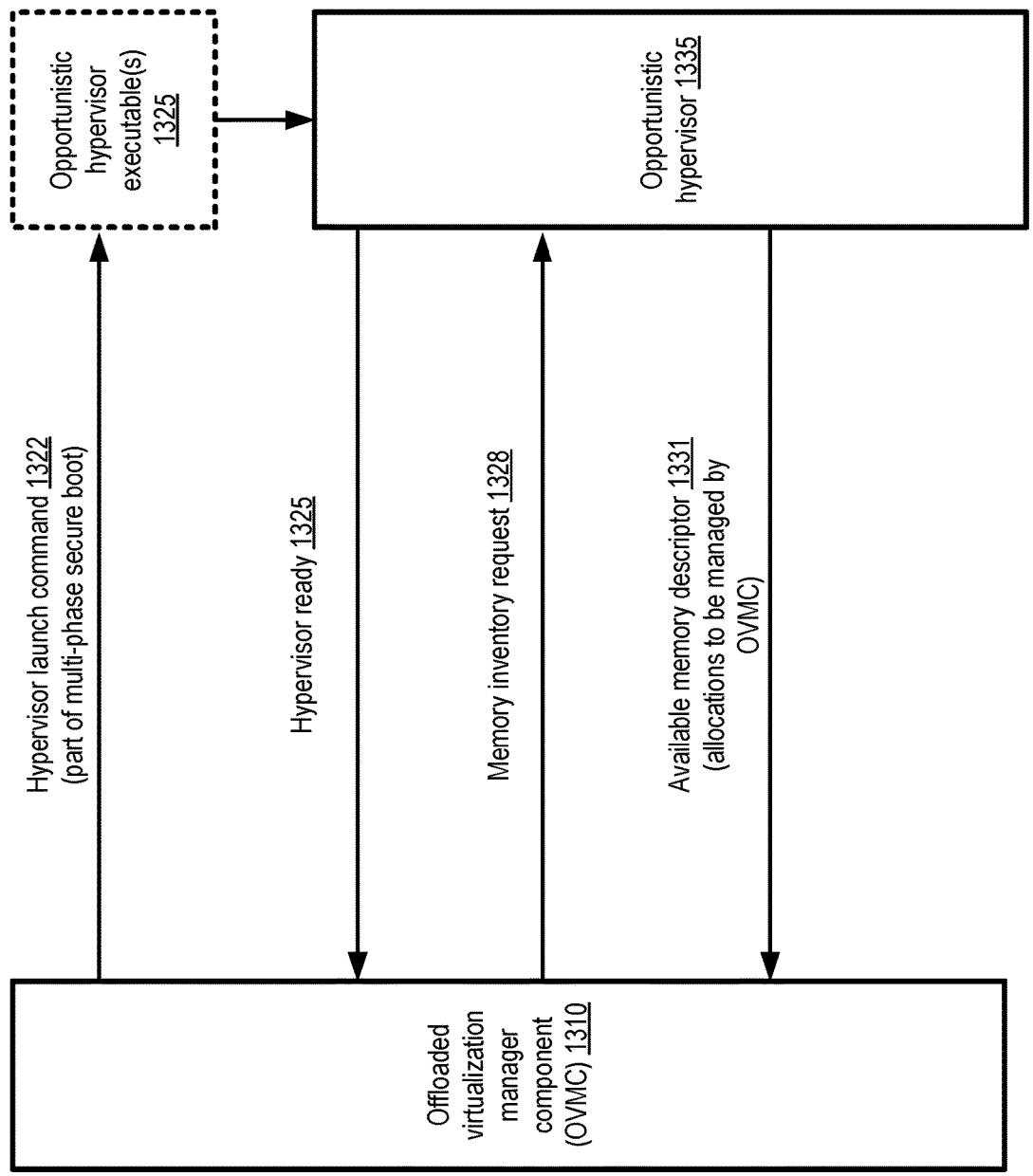
FIG. 13 shows example memory inventory-related interactions between components of a virtualization manager, according to at least some embodiments.

In order to make memory allocation decisions on behalf of GVMs, an OVMC may first need to obtain information about the memory from the hypervisor in various embodiments. FIG. 13 shows example memory inventory-related interactions between components of a virtualization manager, according to at least some embodiments. As shown, an OVMC 1310 may issue a command 1322 to launch the opportunistic hypervisor executable(s) 1325, e.g., during the latter stages of the multi-phase boot operation described earlier. When the hypervisor comes up, it may transmit a message 1325 to the OVMC 1310 indicating that is ready for work.

The OVMC may submit a memory inventory request 1328 to the hypervisor, in effect asking the hypervisor to indicate the regions of memory which are to be managed by the OVMC. The hypervisor may provide the requested information, e.g., in the form of an available memory descriptor 1331. The OVMC may subsequently allocates various portions of this memory to individual GVMs (e.g., to be used for the operating system processes and application processes running within the GVMs) and/or for per-GVM metadata (such as GVM-specific page tables and device state storage information) to be used during live updates of the hypervisor.

Figure 14:
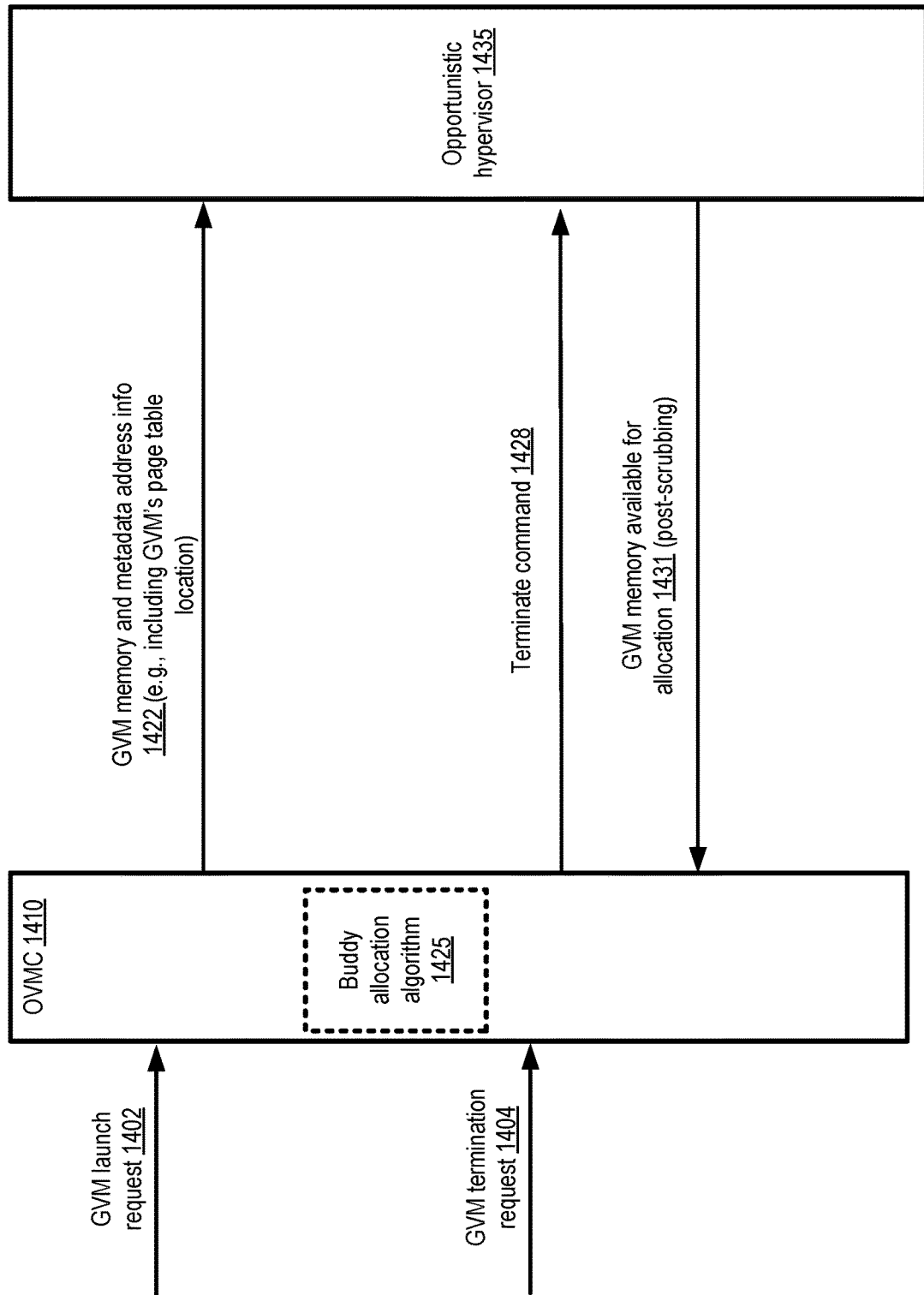
FIG. 14 shows example memory-related interactions, associated with guest virtual machine instantiations and terminations, between components of a virtualization manager, according to at least some embodiments.

FIG. 14 shows example memory-related interactions, associated with guest virtual machine instantiations and terminations, between components of a virtualization manager, according to at least some embodiments. An indication of a launch request 1402 may be received by an OVMC 1410, e.g., from a control plane component of the virtual computing service (where a corresponding request for a GVM from a client may have been received). The request may indicate various properties of the GVM to be instantiated, including for example the size of the memory to be set up for the GVM, the processing capacity to be allocated to the GVM, and so on. The OVMC 1410 may allocate memory for the GVM itself (i.e., for the operating system and applications to be executed at the GVM), as well as for the GVM's page table and various metadata entries that may have to be saved if/when the GVM is paused briefly during a live update of the hypervisor. Information 1422 about the memory allocated for the GVM and its metadata may be provided to the opportunistic hypervisor 1435 by the OVMC, and the OVMC may update its records regarding the amount of free memory which remains available (if any) for additional GVMs at the host. In at least some embodiments, a buddy allocation algorithm 1425 may be used at the OVMC for responding to memory requests of the GVM.

After the client on whose behalf the GVM is instantiated has completed running their applications on the GVM, the client may transmit a GVM termination request to the control plane of the virtualized computing service. An indication of an internal version 1404 of a GVM termination request may be provided to the OVMC 1410 from the control plane. A terminate command 1428 may be transmitted to the opportunistic hypervisor 1435 by the OVMC. In response, the GVM may be shut down by the hypervisor. After the GVM has been shut down, the portion of physical memory which had been allocated to the GVM may be scrubbed or cleaned (e.g., by overwriting the memory with zeroes by a component of the opportunistic hypervisor 1435), and an indication 1431 that the memory is available for other GVMs may be provided to the OVMC 1410. The OVMC may update its records of memory allocation accordingly, and utilize at least some of the released memory for some other GVM as and when needed.

Figure 15:
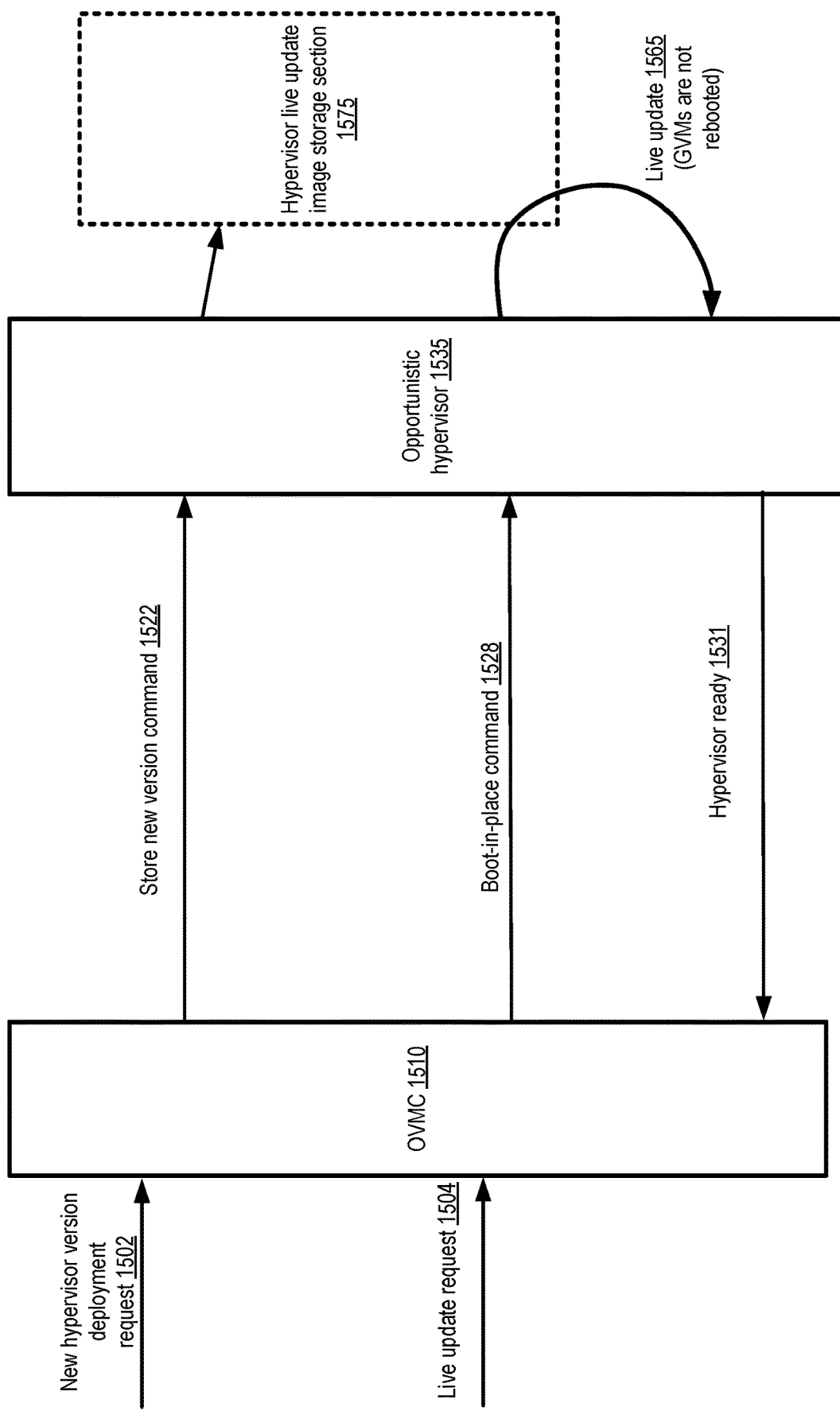
FIG. 15 shows example interactions, associated with live updates of a hypervisor, between components of a virtualization manager, according to at least some embodiments.

FIG. 15 shows example interactions, associated with live updates of a hypervisor, between components of a virtualization manager, according to at least some embodiments. A request 1502 to deploy a new version of the opportunistic hypervisor may be received at an OVMC in the depicted embodiment from a control plane component of the virtualized computing service. In response, a command 1522 to store an executable image of the new version may be transmitted from the OVMC to the currently-running version of the opportunistic hypervisor 1535. In some implementations the OVMC may transmit the contents of the new version, while in other implementations the OVMC may provide an indication of the location from which the new version is to be obtained. The contents of the new version may be saved within the live update image storage section 1575 of the hypervisor-managed portion of the main memory of the virtualization host. In at least some embodiments, the new version may comprise, in addition to various enhancements and/or bug fixes, code to translate existing data structures (including structures used for memory management) used by the current version of the hypervisor for its operations into modified versions to be used by the new version of the hypervisor.

The deployment of the new version of the hypervisor 1435 across the virtualization host fleet may be performed in two temporally decoupled steps in various embodiments: a distribution phase during which the new version is stored in the hypervisor-managed portions of host memory at some number or all of the hosts of the fleet, and an activation phase during which the new version is brought up at the hosts by live booting it. The two phases may be decoupled for various reasons—e.g., because it may take a substantial amount of time to confirm that the new version has been stored without errors at the (potentially very large) targeted set of hosts, and/or to try to avoid scenarios in which a different fractions of the targeted portions of the host fleet end up with different versions of running hypervisors.

To trigger the activation of the stored new version of the hypervisor, a live update request 1504 may be transmitted to an OVMC 1510 in the depicted embodiment. The OVMC 1510 in turn may transmit a boot-in-place command 1528 to the current version of the hypervisor 1535. The current version may pause any running GVMs temporarily, serialize the GVM's state (using OVMC-managed memory), and then use the stored new version to implement the live update 1565. If the reboot to the new version succeeds, the new version of the opportunistic hypervisor may reactivate the GVMs which were paused (if any) and transmit a hypervisor ready message 1531 to the OVMC in the depicted embodiment. The GVMs may not have to be rebooted for the update of the hypervisor in various embodiments, and the time intervals for which the GVMs are paused may typically be small enough that at least some GVM users or applications may not notice the pause. Because the GVM state was saved prior to the reboot-in-place in a portion of OVMC-managed memory, the GVMs may be reactivated rapidly even if, for some reason, the live update fails and the previously-running hypervisor has to resume its operations.

Figure 16:
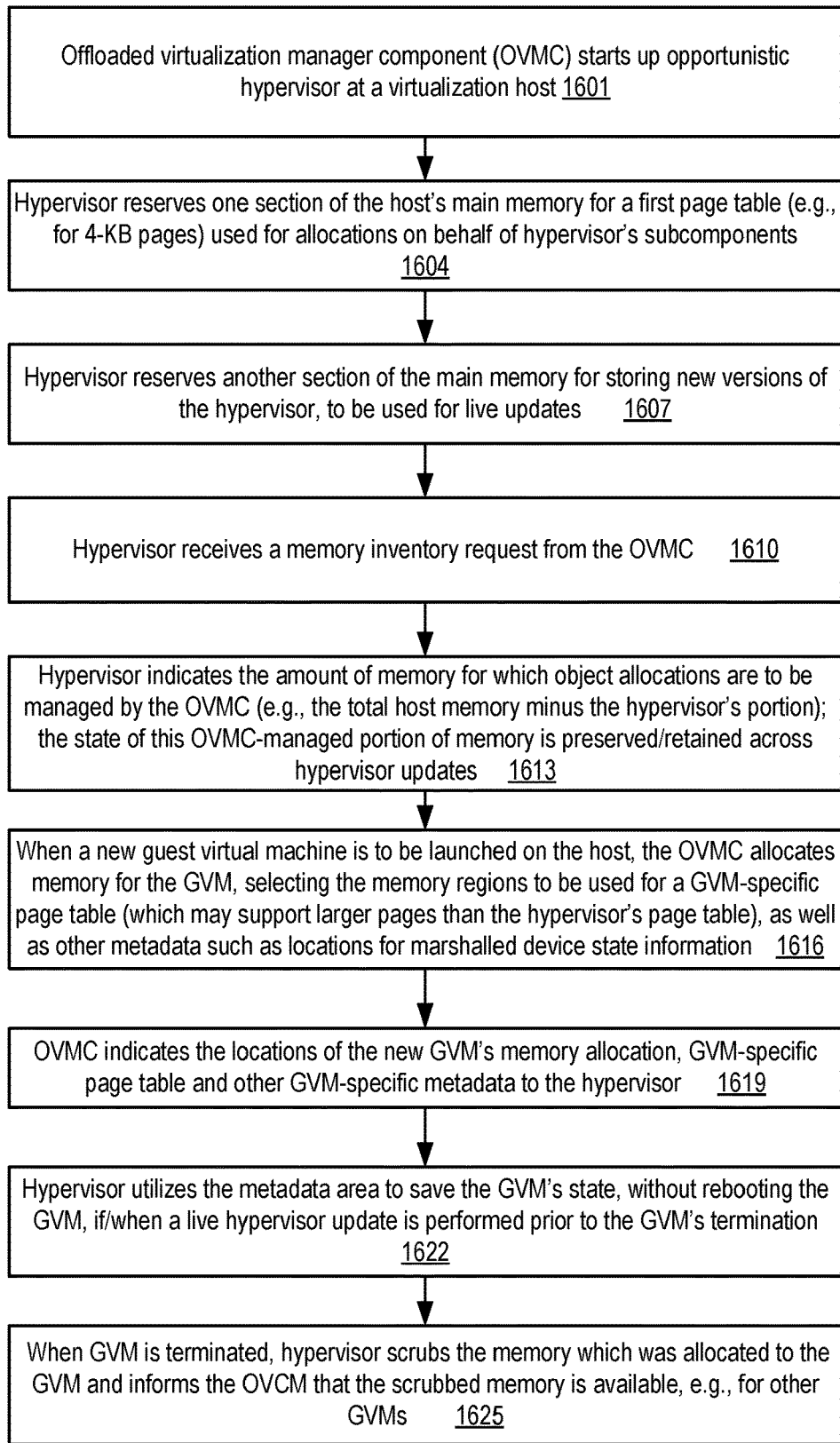
FIG. 16 is a flow diagram illustrating aspects of memory management related operations which may be performed by various components of a partially-offloaded virtualization manager, according to at least some embodiments.

FIG. 16 is a flow diagram illustrating aspects of memory management related operations which may be performed by various components of a partially-offloaded virtualization manager, according to at least some embodiments. As shown in element 1601, an offloaded virtualization manager component (OVMC) may start up one or more components of the opportunistic hypervisor at the virtualization host, e.g., in one of the later phases of the multi-phase boot operation discussed earlier. The hypervisor may reserve a section of the host's main memory for a first page table to manage its own memory allocations (i.e., the hypervisor's internal memory allocations, for the various subcomponents of the hypervisor such as the hypervisor controller, the GVM managers, and the like, as opposed to the memory allocated for GVMs) (element 1604). In at least some embodiments, the sizes of the pages represented in this hypervisor page table may be set to four kilobytes or some other relative small page size, based for example on the typical memory allocation patterns expected from the hypervisor's subcomponents.

A second portion of the host's main memory, which also forms part of the hypervisor-managed portion of the host's main memory, may be set aside for live updates of the hypervisor (element 1607), e.g., to store a new version of the hypervisor as and when an update is required. A new version may not necessarily be available at this stage, but space to be eventually used for it may nevertheless be reserved in the depicted embodiment.

The OVMC may transmit a memory inventory request to the hypervisor (element 1610), e.g., to determine how much of the main memory (and which specific sections) are to be managed by the OVMC for GVMs and associated metadata. The hypervisor may transmit an indication of the size and location this OVMC-managed portion of the memory (element 1613) back to the OVMC in the depicted embodiment. The OVMC-managed portion may comprise the difference between the total physical memory available (detected by the hypervisor during its initialization) and the portion which is hypervisor-managed. The OVMC-managed portion may remain preserved (i.e., may not be overwritten) during hypervisor live updates.

After the information regarding the OVMC-managed memory region has been processed, the OVMC may enable the instantiation of GVMs at the host. When a new GVM is to be instantiated, the OVMC may select the regions of memory to be used for the GVM (e.g., including a GVM-specific page table, space for the operating system and processes of the GVM, and a metadata area to be used to save GVM marshalled device state information) (element 1616) from the OVMC-managed region. While the particular memory address range in which a GVM's page table is to be set up may be selected by the OVMC, the hypervisor may be responsible for actually creating the page table in various embodiments. The address range to be used for the page table may be provided as part of GVM paging metadata to the hypervisor by the OVMC. The GVM-specific page table may support pages of a different size (or multiple sizes) than the page size or sizes used by the hypervisor for the hypervisor-managed section of the memory in at least some embodiments. The paging metadata may include an indication of the page size to be used for the GVM in some implementation. The hypervisor may be notified regarding the allocation decisions made for the GVM by the OVMC (element 1619).

If and when a live update of the hypervisor is to be performed before the GVM is terminated, the hypervisor may pause the virtual CPUs of the GVM and save device state in the metadata area which had been allocated for the GVM by the OVMC (element 1622). The live update of the hypervisor may be performed without rebooting the GVMs of the host; instead, the state of the GVMs may be restore after a short interval during which the GVMs are paused in the depicted embodiments. When the GVM is eventually terminated, the memory which was allocated to it by the OVMC may be scrubbed by the hypervisor (element 1625), and the OVMC may be informed that the terminated GVM's memory is available, e.g., for other GVMs.

Figure 17:
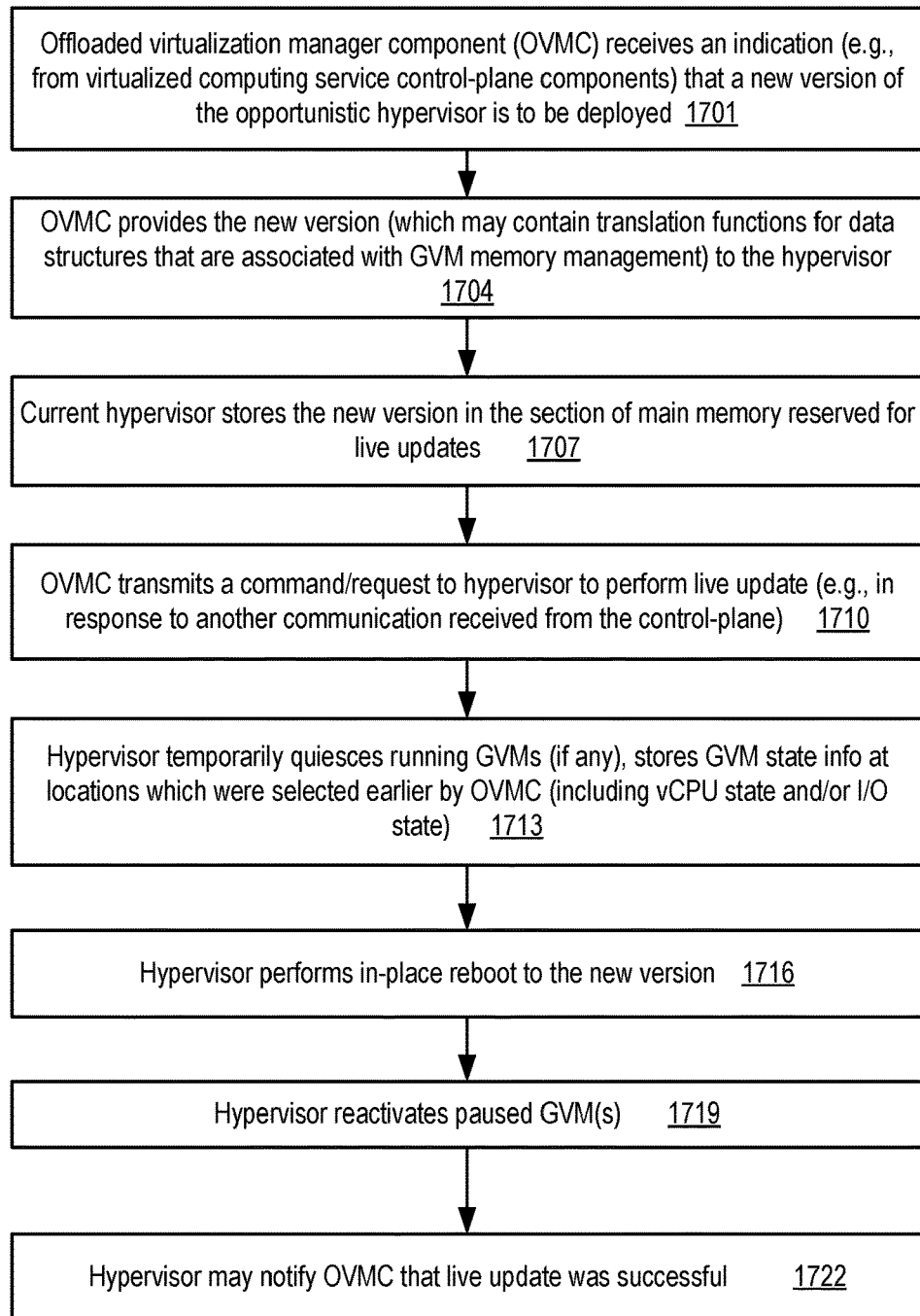
FIG. 17 is a flow diagram illustrating aspects of operations associated with live updates of hypervisors, according to at least some embodiments.

FIG. 17 is a flow diagram illustrating aspects of operations associated with live updates of hypervisors, according to at least some embodiments. As shown in element 1701, an offloaded virtualization manager component (OVMC) at a virtualization host may receive an indication that a new version of the opportunistic hypervisor is to be installed or deployed on the host (at which a current version of the opportunistic hypervisor is already running). The indication may be received, for example, from a control plane component of the virtualized computing service at which the virtualization host is being used. The OVMC may transmit the contents of (or a pointer to the contents of) an executable for the new version to the current version of the hypervisor (element 1704), e.g., to the hypervisor controller subcomponent. The new version may comprise, in addition to new features, bug fixes and the like, translation functions used for various data structures used at the hypervisor in some embodiments. For example, a new attribute may have been added to a particular memory management-related data structure in the new version of the hypervisor, and a translation function may be provided to convert the old data structure (which may be stored in a metadata region allocated by the OVMC) to the modified data structure.

The current hypervisor version may store the executable for the new version in the section of the host's main memory which was designated for live updates (element 1707). After the new version has been safely stored, at some point the OVMC may transmit a request or command to the current hypervisor to activate the new version via a live update (element 1710)—e.g., using an update procedure which does not require guest virtual machines to be rebooted. The activation command/request may be transmitted from the OVMC to the hypervisor in response to another communication from the control plane of the virtualized computing service in some embodiments. In other embodiments, the live update may be initiated by the OVMC without any additional communications or directives from the control plane, or by the current version of the hypervisor itself (e.g., as soon as the new version has been stored in the hypervisor-managed portion of the main memory, the live update may be initiated).

The current version of the hypervisor (e.g., the GVM manager components of the hypervisor) may quiesce or pause running GVMs as part of the live update in the depicted embodiment. State information associated with a given GVM (including for example virtual CPU state, pass-through I/O device state and the like) may be stored in the appropriate per-GVM metadata section of the OVMC-managed portion of the main memory (element 1713).

After pausing and saving the state information of the GVM(s), the hypervisor may perform an in-place reboot to the new version, e.g., using the equivalent of a "kexec" mechanism in the depicted embodiment (element 1716). During this phase, at least a portion of the main memory that was previously being used by the pre-update version of the hypervisor may be overwritten, but the OVMC-managed portion of the main memory may remain unmodified. After the new version of the hypervisor boots, it may reactivate the paused GVMs (element 1719). In some embodiments, a notification may be provided to the OVMC that the live update succeeded (element 1722). A similar set of operations may be performed several times during the lifecycle of a virtualization host in various embodiments, as new versions of the hypervisor are developed and deployed at the virtualized computing service.

In at least one embodiment, at least some memory allocations for guest virtual machines may be performed at control plane components of the virtualization service which are not part of an offload card per se. For example, a control plane component running at a separate host than the virtualization host (reachable from the virtualization host via a network) may be responsible for querying the hypervisor of the virtualization host regarding available memory for GVMs, allocated per-GVM memory, and so on in some such embodiments. Such a remote control plane component may be considered another variant of an offloaded virtualization manager component with respect to the virtualization host.

Opportunistic Task Processing at the Hypervisor

As mentioned earlier, the virtualization manager may be designed so as to minimize the consumption of host resources (e.g., physical CPUs and physical memory) which could otherwise be employed for guest virtual machines in various embodiments. In some embodiments, one aspect of this minimization may comprise a hypervisor which defers certain virtualization management tasks until a voluntary relinquishment of a physical CPU by a GVM, and then takes the opportunity to perform the tasks during time intervals when the GVM does not expect the physical CPU to be available. In order to do so, an asynchronous approach towards commands/requests issued by the OVMC or the virtualized computing service's control plane may be taken in various embodiments. Furthermore, by default, some or all of the subcomponents of the hypervisor may remain in a quiesced or passive state, exiting the passive state when opportunities to utilize the host resources become available, and/or when messages from other subcomponents are received. This opportunistic approach may help reduce the variability or jitter in the performance of application operations being executed at the GVMs as mentioned earlier.

Figure 18:
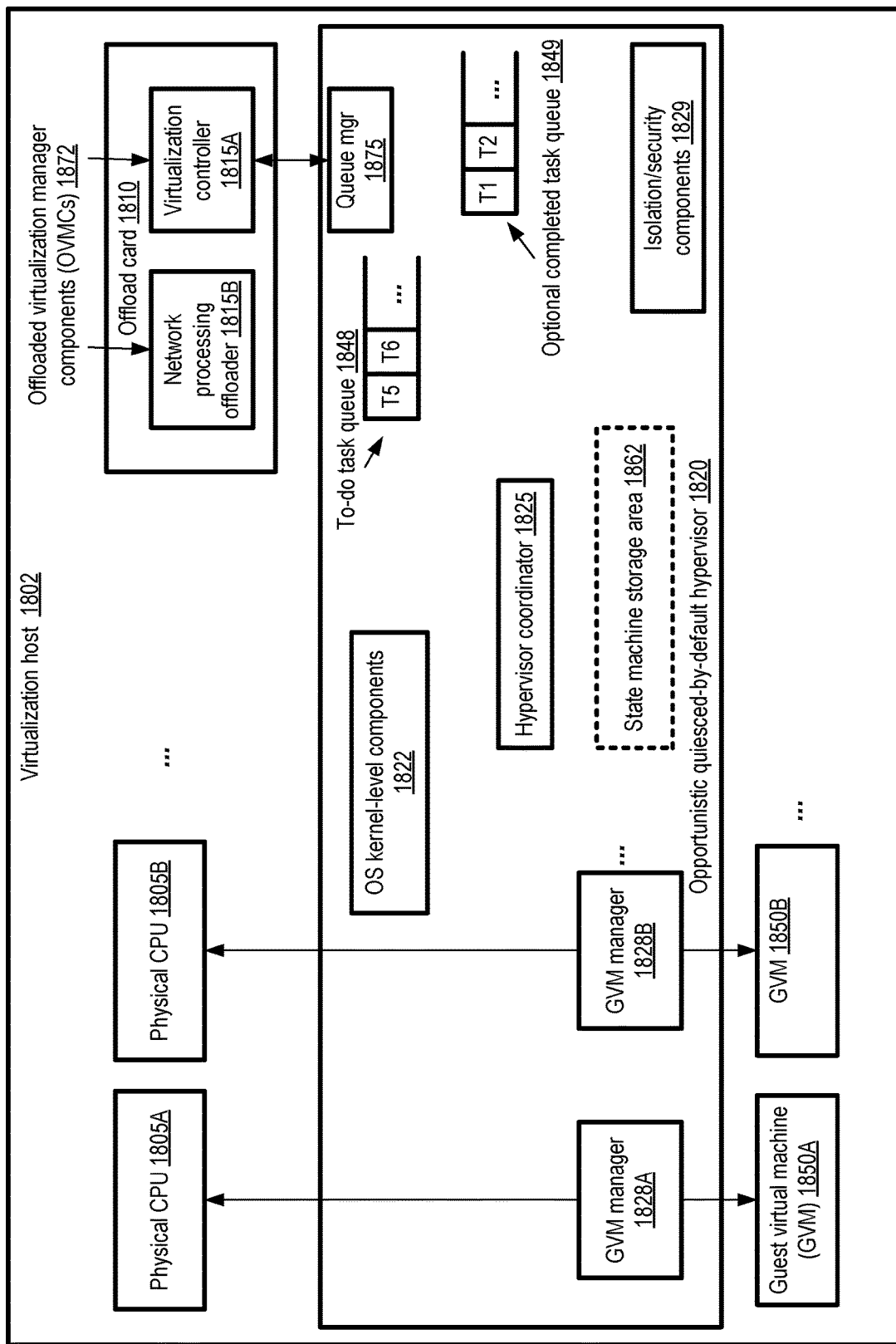
FIG. 18 illustrates example subcomponents and communication mechanisms of an opportunistic hypervisor, according to at least some embodiments.

FIG. 18 illustrates example subcomponents and communication mechanisms of an opportunistic hypervisor, according to at least some embodiments. As shown, virtualization host 1802 may comprise a number of physical CPUs (pCPUs) 1805, including pCPUs 1805A and 1805B. The host may also comprise an opportunistic quiesced-by-default hypervisor 1820, and one or more offloaded virtualization manager components (OVMCs) 1872 on an offload card 1810. The OVMCs may include a network processing offloader 1815 and a virtualization controller 1816. The hypervisor 1820 may comprise a hypervisor coordinator 1825, kernel-level components 1822, one or more GVM managers 1828, isolation/security components 1829 and a queue manager 1875 in the depicted embodiment.

In the example scenario shown, each of the pCPUs 1805 is designated for use by a respective GVM—e.g., GVM manager 1828A maps the virtual CPU allocated to GVM 1850A to the pCPU 1805A, and GVM manager 1828B maps the virtual CPU allocated to GVM 1850B to pCPU 1805B. In other embodiments, a 1:1 mapping between GVMs and pCPUs may not necessarily be enforced—e.g., a single pCPU may be shared among several GVMs, or a given GVM may be mapped to more than one pCPU.

The queue manager 1875 may act as the intermediary between the virtualization controller 1816 and the hypervisor's other components in the depicted embodiment. In some implementations, the virtualization controller 1816 may expose itself as an NVMe (non-volatile memory express) device, and the queue manager may translate administrative commands/requests issued by the virtualization controller into respective entries in a logical "to-do" task queue 1848 (such as entries T5 and T6). Examples of such tasks may include, among others, collecting metrics associated with a given GVM, various hardware subcomponents or the hypervisor itself, initiating a shutdown or restart of an existing GVM, launching a new GVM, scrubbing memory which was in use by a GVM which is being terminated, and so on. It is noted that in at least some embodiments, a queue-oriented or first-in-first-out protocol may be used without necessarily implementing a physical queue data structure. That is, a logical to-do task queue 1848 may sometimes be implemented using physical data structures other than a queue, such as a linked list of buffers or the like. In at least some embodiments, variations on a straightforward queue may be used—e.g., entries may be positioned within the queue on the basis of relative priority instead of using a pure first-in-first-out policy.

Other components of the hypervisor such as the hypervisor coordinator 1825 may, when activated as result of the release of a pCPU by a GVM, examine the contents of the to-do task queue and take responsive actions if there are outstanding tasks. Depending on the nature of the task, the hypervisor coordinator may either perform the task itself, or pass it to another subcomponent for implementation. After the task is complete, in some embodiments an entry (e.g., T1 or T2) indicative of the results of the requested operations may be placed in an optional completed task queue 1849. The queue manager may provide an indication to the virtualization controller that a requested task has been completed (and/or the results of the requested task) if/when the corresponding entry has been placed in the completed task queue 1849 in the depicted embodiment. In some embodiments, a completed task queue may not be implemented. In at least one implementation, pipes may be used as a unified internal communication mechanism among at least some of the hypervisor subcomponents. Several or all of the subcomponents may typically spend much of the time blocking on a polling primitive (e.g., using the epoll( ) system call or a logical equivalent), waiting for a message.

As soon as a hypervisor subcomponent has completed at least a targeted portion of a given virtualization management task assigned to it, it may transition to a default passive or quiesced state, and the pCPU which was used for the task may be released back to the GVM which had relinquished the pCPU in the depicted embodiment. A GVM may give up the pCPU for various reasons in different embodiments, e.g., because the GVM has to wait for an I/O operation to complete, or because a timer value has to be read, and so on. In some embodiments, the GVM may request an operation which is to be coordinated or performed by a hypervisor component, and may relinquish the pCPU to enable the hypervisor to perform the requested operation. An administrative component of the GVM, such as an operating system component or a device driver-level component, may typically relinquish the pCPU in various embodiments.

In some implementations, the issuance of a particular virtualization instruction (which may be termed a "VM exit" instruction) by a GVM may indicate to a kernel-level component 1822 that a pCPU is being relinquished. The kernel-level component may inform one or more other components of the hypervisor 1820 (such as the GVM manager 1828 associated with the GVM which is switching context, and/or the hypervisor coordinator 1825) that a pCPU has become available. This notification may trigger an examination (using the now-available pCPU) of the to-do task queue 1848, which in turn may lead to the execution of one or more queued tasks (as well as the GVM-requested operation which led to the freeing of the pCPU by the GVM, if such an operation was requested). The freed pCPU may be used to perform at least part of a queued task. When the queued task is completed, the hypervisor component which performed the task may retransition to its default passive/quiesced state in various embodiments. Queued virtualization management tasks may primarily (or only) be performed using the pCPU during periods of time in which a GVM does not expect to use the pCPU in various embodiments.

In most cases, individual virtualization management tasks handled at the opportunistic hypervisor may take very little time in various embodiments, especially relative to the length of the interval for which the GVM (whose relinquishing of the pCPU led to the execution of the task) typically expects not to use pCPU after relinquishing it. As a result, most tasks may be run to completion by the hypervisor before the hypervisor itself releases the pCPU. However, in at least some embodiments the hypervisor may sometimes be required or requested to perform longer-lasting virtualization management tasks. In such embodiments, the work required for the longer task may be managed using a state machine, with individual transitions of the state machine corresponding to separately-performable subtasks of the overall task. In the embodiment depicted in FIG. 18, a state machine storage area 1862 may be used to deal with such longer lasting tasks.

Instead of performing the entire longer task at once, one or a few state transitions of the corresponding state machine may be performed at a time before the hypervisor releases the pCPU in the depicted embodiment, with an indication that the state transitions have been completed being stored in area 1862. When a pCPU becomes available, a hypervisor component may in some cases determine (e.g., by examining the head of the to-do task queue) that a task represented by a state machine is yet to be completed. The hypervisor component may then examine the current state of the machine, identify the work which needs to be done to perform the next transition, perform that work, update the state machine representation in area 1862, and then release the pCPU to re-enter its quiescent state even if more state transitions remain to be completed. Each time the hypervisor component gets an opportunity to perform more of the longer-lasting task's work, it may do so, until the task is eventually completed. In some cases more than one state transition may be completed before the pCPU is released back to the GVM.

In some cases, a virtualization management task may be assigned a high priority, e.g., by the control plane of the virtualized computing service, indicating that the task should be completed as soon as possible even if this requires activating a hypervisor component before a pCPU is voluntarily given up by a GVM. An interrupt-based mechanism may be used for such high priority tasks, which may typically be required very infrequently in most embodiments. Instead of passively queueing a task, the virtualization controller may issue an interrupt to the hypervisor, causing a hypervisor component to awaken and initiate the high-priority task. Such a high-priority task may include, for example, diagnosing or resolving an unhealthy state of a particular guest virtual machine (e.g., if a GVM appears to be stuck in an infinite loop or is unresponsive to normal communications). The interrupt-based mechanism may serve as a backup technique for interactions between the OVMCs and the hypervisor in some embodiments, used primarily under unusual circumstances when the queue-based mechanism appears to be insufficient.

Figure 19:
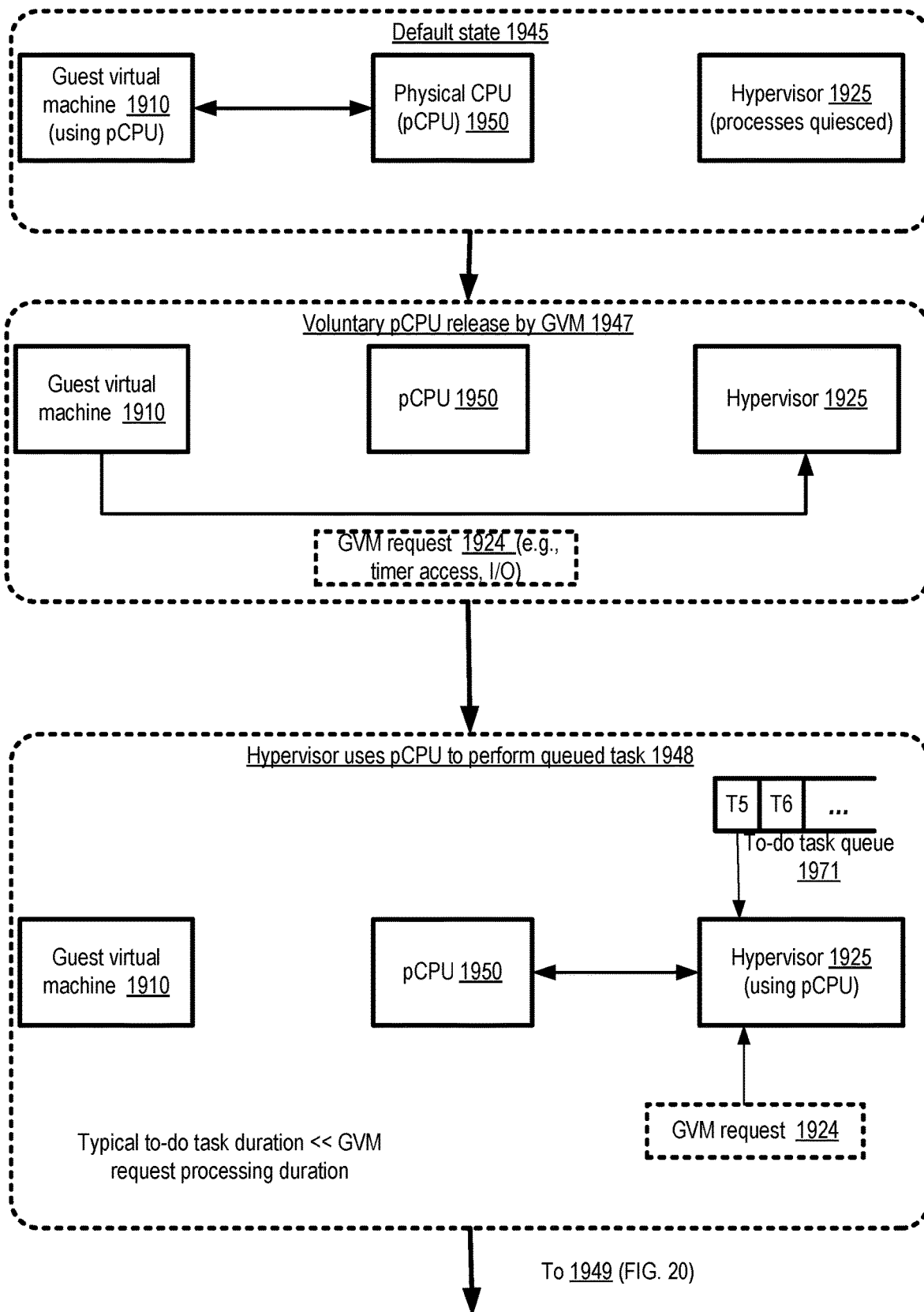
FIG. 19 and FIG. 20 collectively illustrate an example sequence of events associated with the execution of an administrative task by an opportunistic hypervisor, according to at least some embodiments.
Figure 20:
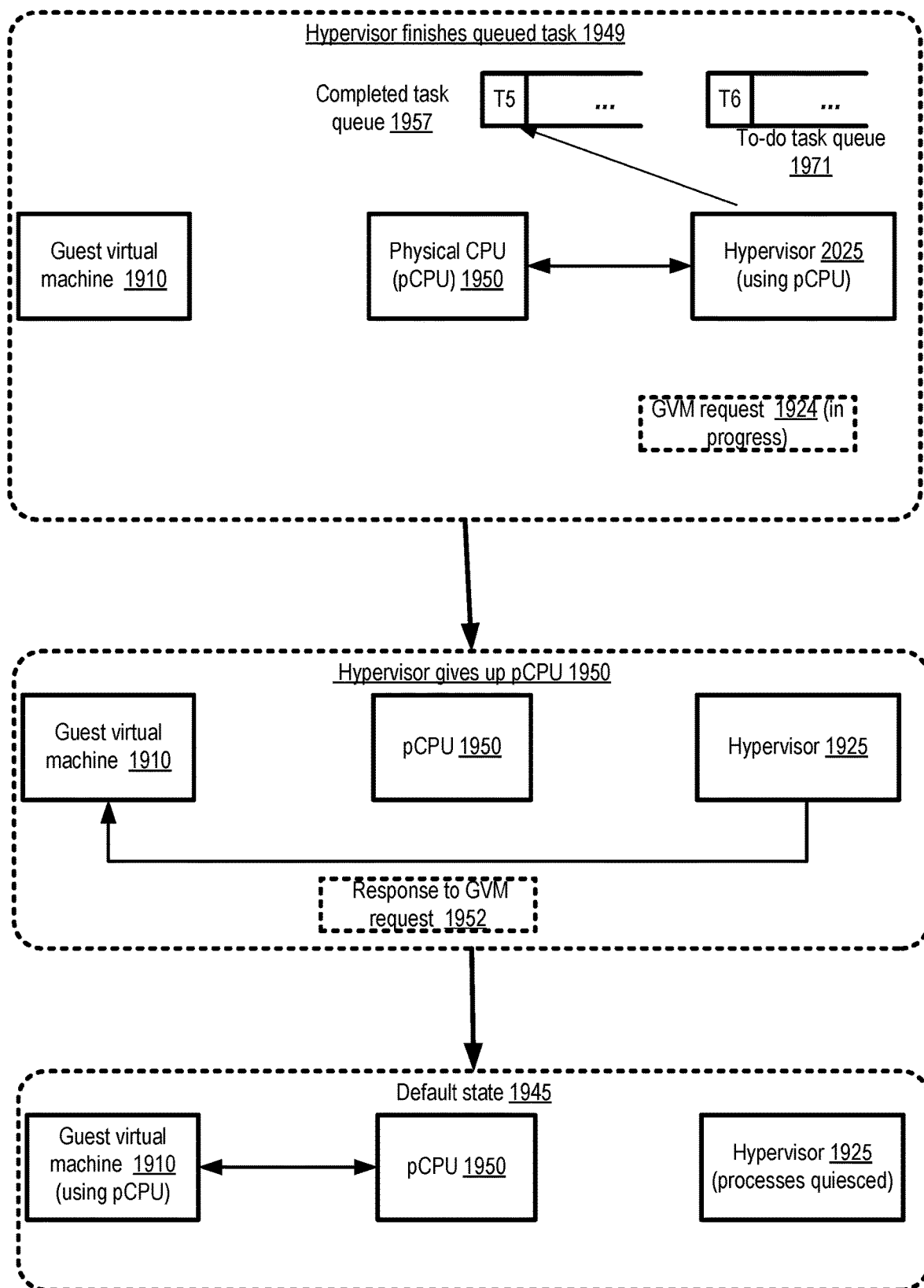

FIG. 19 and FIG. 20 collectively illustrate an example sequence of events associated with the execution of an administrative task by an opportunistic hypervisor, according to at least some embodiments. In default state 1945, a guest virtual machine 1910 utilizes the pCPU 1950, while the processes/components of the hypervisor 1925 remain in a quiesced or passive state (i.e., not consuming pCPU cycles), waiting for the GVM 1910 to release the pCPU.

The GVM 1910 may eventually voluntarily release the pCPU as shown in element 1947 of FIG. 19. In some cases, the GVM 1910 may issue a request 1924 (such as a timer access request or an I/O request) to the hypervisor 1925, which requires a response before the GVM can proceed, and the pCPU 1950 is relinquished until the response is obtained. In some cases, the GVM 1910 may give up the pCPU without issuing a work request 1924—e.g., if an application running at the GVM issues a sleep( ) command or the equivalent.

As shown in element 1948, the hypervisor 1925 may then acquire the pCPU 1950. The hypervisor may examine the to-do-task queue 1971 to see whether there are any outstanding (as yet incomplete) virtualization management tasks. In the depicted scenario, tasks T5 and T6 are present in the to-do queue 1971, so the hypervisor may initiate the work corresponding to at least the task at the head of the queue (i.e., T5). The work associated with the GVM request 1924 may continue (e.g., in parallel with the examination of the queue 1971 and the execution of task T5). The typical duration of a queued task may be much shorter than the time required to process the GVM request 1924 in various embodiments.

The de-queued task may eventually be completed (as shown in element 1949 of FIG. 20) by the hypervisor using the pCPU which was given up by GVM 1910. An entry indicating that T5 has been completed may be placed in a completed task queue 1957 in the depicted embodiment. The work associated with GVM request 1924 may still be ongoing in some cases. The hypervisor may give up the pCPU after finishing T5 in the depicted embodiment (as indicated in element 1950 of FIG. 20), even though task T6 may remain outstanding. In some embodiments, the hypervisor may estimate how long the GVM request 1924 is going to take, and perform more than one queued task (e.g., both T5 and T6) if its estimate indicates that the queued tasks can be completed before the GVM request is fulfilled. A response 1952 corresponding to the GVM request 1924 may eventually be provided to the GVM 1910. The GVM may then re-acquire the pCPU and the default quiescent state may be re-entered again by the hypervisor (element 1945).

Figure 21:
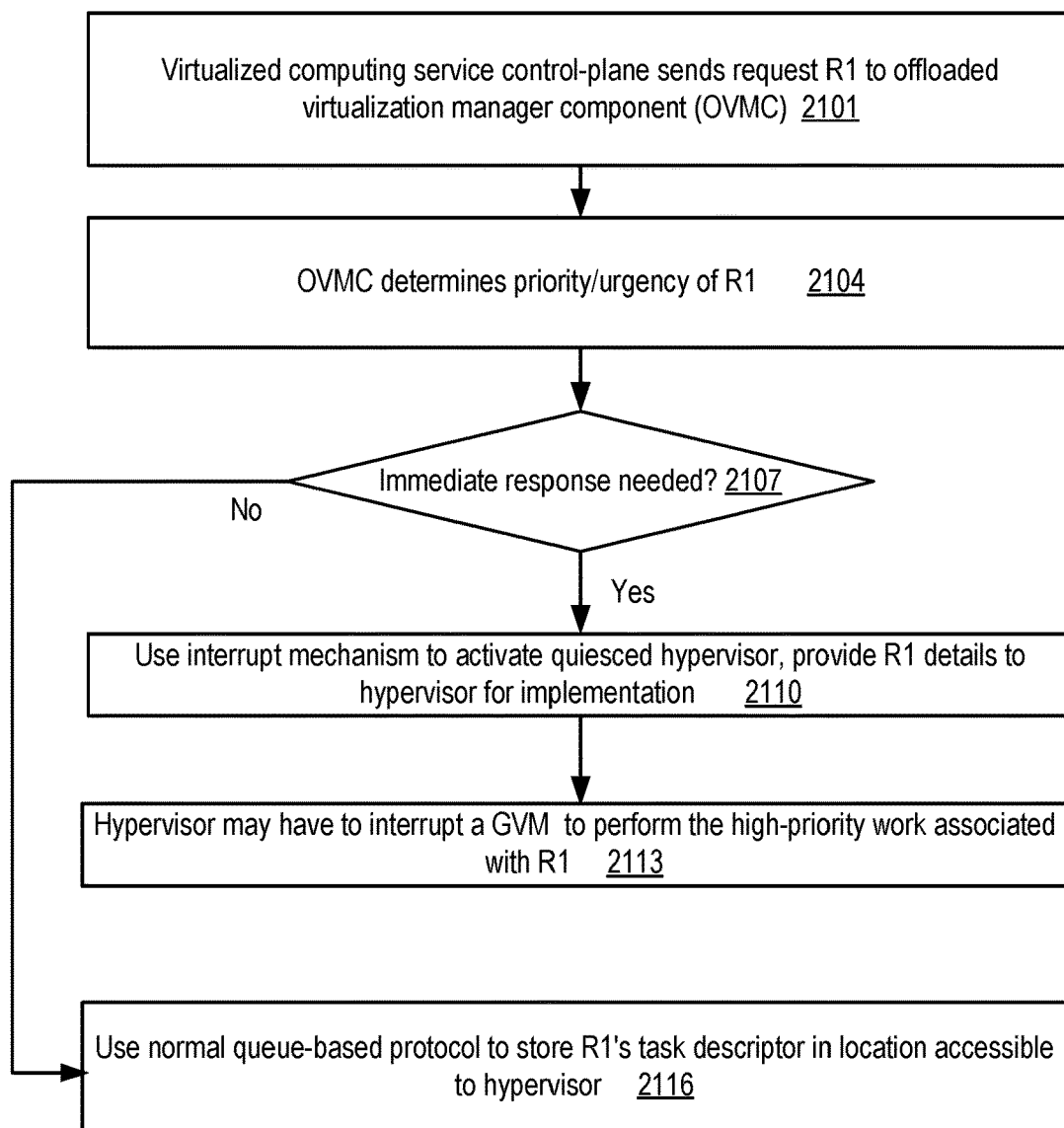
FIG. 21 is a flow diagram illustrating aspects of operations associated with implementing interrupt-driven and queue-based tasks at a hypervisor, according to at least some embodiments.

As mentioned earlier, for certain virtualization management tasks, an interrupt-based approach to activating the hypervisor may be taken. FIG. 21 is a flow diagram illustrating aspects of operations associated with implementing interrupt-driven and queue-based tasks at a hypervisor, according to at least some embodiments. As shown in element 2101, the control plane of the virtualized computing service may transmit a request R1 to on offloaded virtualization manager component. The OVMC may determine the priority or urgency of the requested operations (element 2104). If an immediate or urgent response is needed (i.e., if request R1 has a high priority relative to the average virtualization management task), as determined in operations corresponding to element 2107, an interrupt mechanism may be used to activate the hypervisor (element 2110). The details of the work required for R1 may be provided to the hypervisor for immediate implementation. In at least some embodiments, the hypervisor may in turn interrupt or pause a GVM to perform the high-priority work (element 2113). As mentioned earlier, in some cases a high-priority request may involve resolving or debugging an unusual or unexpected state of a GVM—e.g., a GVM which does not appear to be responding to normal communications or appears to be stuck in a loop.

If R1 corresponds to a normal priority task which does not have to be completed immediately, as also determined in operations corresponding to element 2107, a queue-based protocol may be used to asynchronously inform the hypervisor about R1 (element 2116). For example, a task descriptor containing R1 details may be placed into a queue or some other location from which it can be read by a hypervisor component when a pCPU is relinquished by a GVM and the hypervisor transitions from a passive state to an active state.

Figure 22:
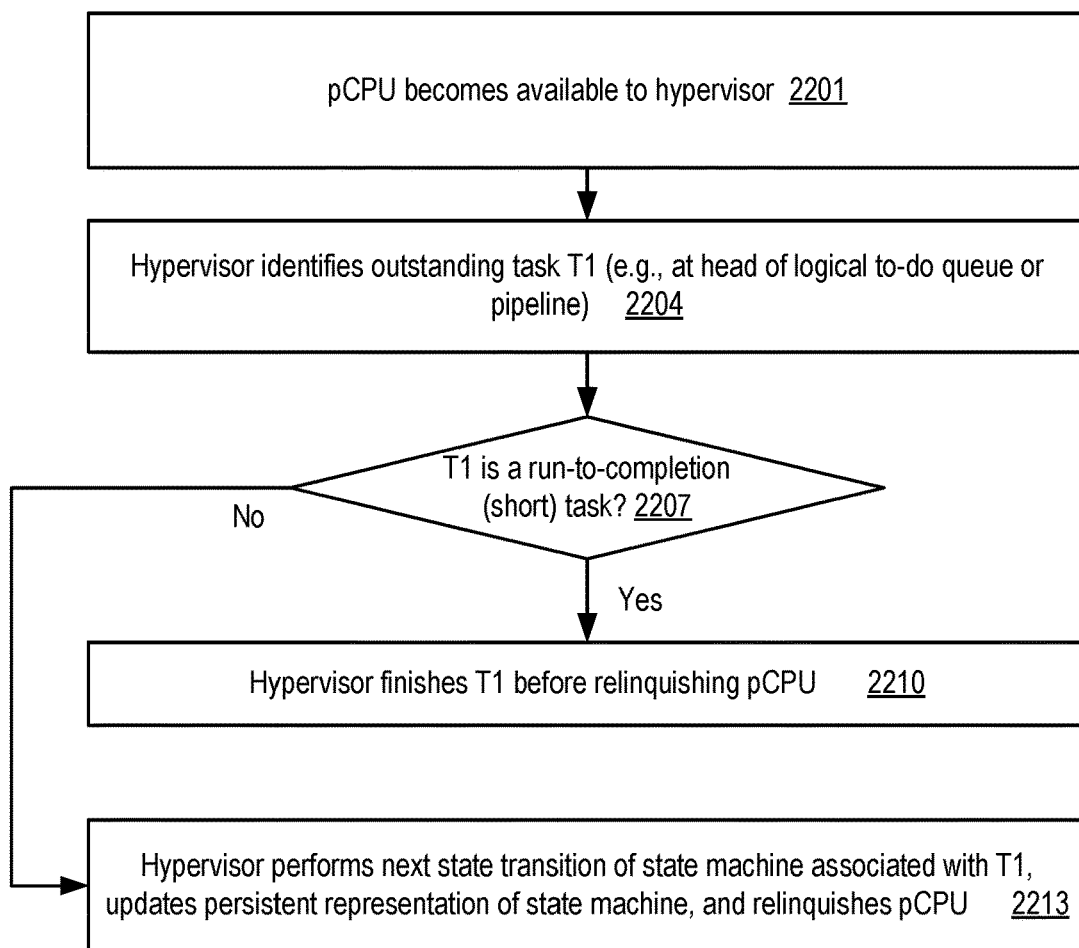
FIG. 22 is a flow diagram illustrating aspects of operations associated with managing tasks of different expected durations at a hypervisor, according to at least some embodiments.

As discussed above, in some cases a long-duration virtualization management task may have to be performed by a hypervisor, in contrast to most tasks which are relatively short. FIG. 22 is a flow diagram illustrating aspects of operations associated with managing tasks of different expected durations at a hypervisor, according to at least some embodiments. As shown in element 2201, a physical CPU may become available to a hypervisor (e.g., when a GVM voluntarily releases the pCPU). The hypervisor may identify an outstanding virtualization management task T1 which has not yet been completed, e.g., by examining the head of a logical to-do task queue or pipeline (element 2204).

Virtualization management tasks may be categorized as run-to-completion tasks (typically short in duration) and state-machine-requiring tasks (longer in duration) in the depicted embodiment. If the hypervisor determines that T1 is a run-to-completion task (as determined in operations corresponding to element 2207), the hypervisor may finish T1 before releasing the pCPU back for GVM use (element 2210). Otherwise, if T1 is a longer task requiring the use of a state machine, as also determined in operations corresponding to element 2207, the state machine representation for T1 may be accessed (or created, if this is the first time that T1 has been encountered). Work corresponding to the next transition of the state machine may be implemented. The state machine representation may be updated to indicate that the transition has been performed, and the pCPU may be released by the hypervisor (element 2213). In some embodiments, the decision as to whether a task requires a state machine or not may be made at least in part at an offloaded virtualization manager component or at a control plane component of the virtualized computing service—that is, the hypervisor may not have to make the decision on its own.

It is noted that in various embodiments, at least some operations other than those illustrated in the flow diagrams of FIG. 5, FIG. 6, FIG. 7, FIG. 16, FIG. 17, FIG. 21 and FIG. 22 may be used to implement the various virtualization management techniques described above. Some of the operations shown may not be implemented in some embodiments or may be implemented in a different order, or in parallel rather than sequentially.

Figure 23:
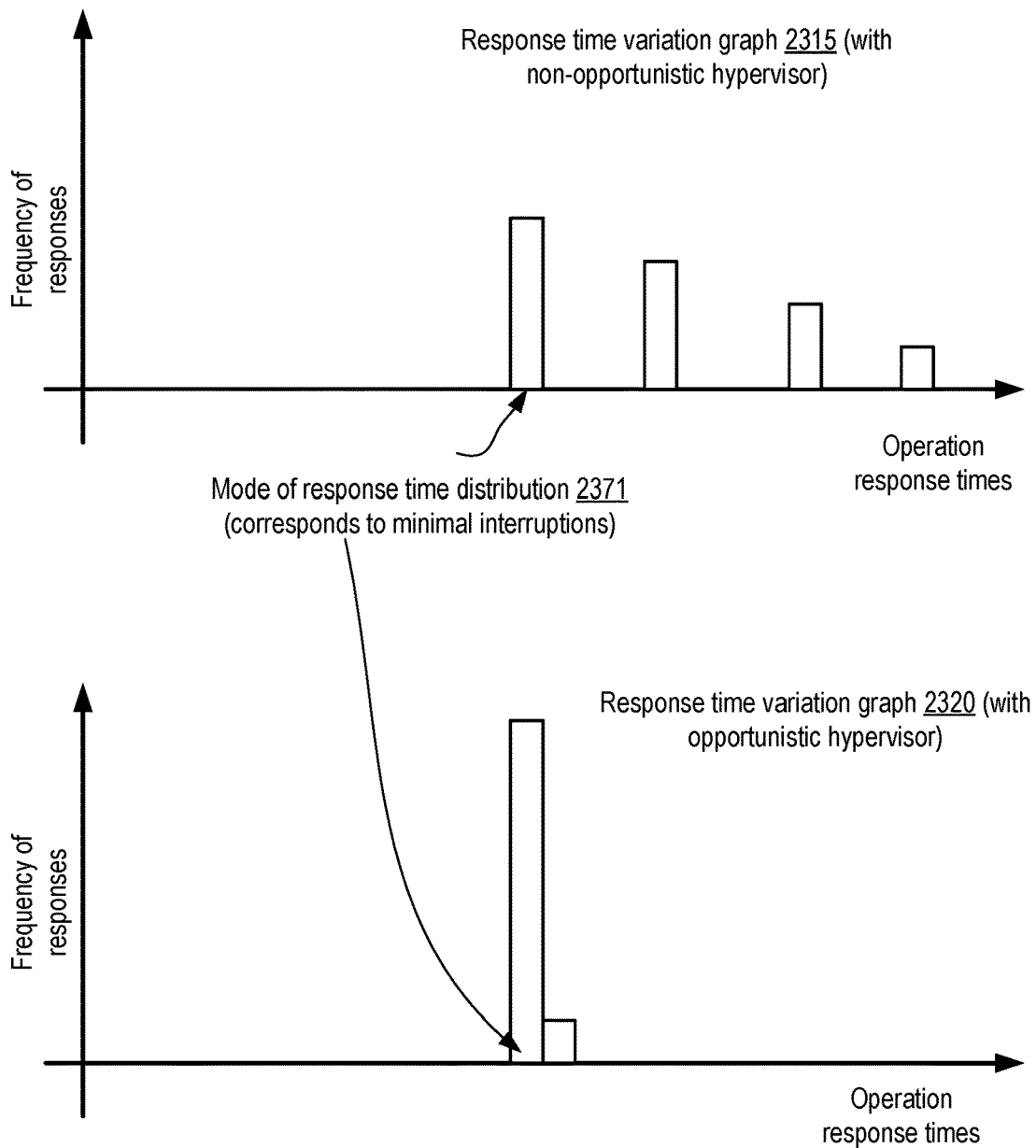
FIG. 23 provides an example of a reduction in response time variations for applications which may be made possible by the use of an opportunistic hypervisor, according to at least some embodiments.

FIG. 23 provides an example of a reduction in response time variations for applications which may be made possible by the use of an opportunistic hypervisor, according to at least some embodiments. Element 2310 shows an example pseudo-code section of a time sensitive application or test which may be run using a guest virtual machine of a virtualized computing service. In this example, ten thousand iterations of a time sensitive operation are performed in a loop. The time sensitive operation may comprise computations that can be performed on a pCPU alone in some cases, or may involve communicating with some other network endpoint in a request-response mode in other cases.

The two histogram-style graphs 2315 and 2316 represent response time frequency distribution in scenarios in which a non-opportunistic hypervisor is used, and an opportunistic hypervisor is used, respectively. The response times measured for individual iterations of the time sensitive operations increase along the X-axis, while the frequencies of occurrences of the response times increase along the Y-axis in each of the graphs. When a tradition non-opportunistic hypervisor is employed, the processing associated with the application's time-sensitive operations may be interrupted quite often, resulting in a response time frequency distribution similar to that shown in graph 2315. Although the largest number of the response times (the mode 2371 of the distribution) may correspond to scenarios in which the application task was not disrupted much (i.e., there were minimal interruptions due to the hypervisor or other virtualization management components), there are still a substantial number of response times larger than the mode, showing quite a lot of variation. The larger spread in the response times may have been caused by a variety of hypervisor-generated interruptions of the application, with different interruptions taking different amounts of time depending on the virtualization management task being performed by the hypervisor in each case.

In contrast, in scenarios in which an opportunistic hypervisor of the kind described above (which tends not to acquire a physical CPU until a guest virtual machine voluntarily relinquishes it) is used, the distribution of the response times may be quite different. The vast majority of the response times may be closely clustered around the minimal interruption value, thereby indicating much lower jitter than when a non-opportunistic hypervisor is used. There may still be a few cases of higher response times, but these cases would also tend to be close to the minimal-interruption mode value. The reduction in variation of response times for time-critical application operations, made possible by the use of an opportunistic and low-footprint hypervisor, may be of tremendous value to certain classes of applications in various embodiments.

Use Cases

The techniques described above, of offloading much of the virtualization management processing workload away from the primary CPUs and memory of a virtualization host, and implementing a multi-phase virtualization manager boot process with enhanced security features, may be useful in a variety of environments. In many large-scale virtualized computing services implemented at provider networks, the overhead associated with virtualization management may represent a significant business cost. CPU cycles and memory space that cannot be assigned to service customers' virtual machines may result in lower returns on investment for the provider network operator. Furthermore, at least for certain applications, the extent to which the virtualization management components interfere with customer applications may impact results of time-critical applications and therefore may affect customer satisfaction. The offloading techniques described herein may significantly reduce the resource (e.g., CPU and memory) footprint associated with virtualization management, and reduce variability in application performance. Security and isolation requirements of service customers may also be fulfilled more easily when much of the virtualization management is handled from an offload card rather than by using a separate administrative instance of an operating system and a full-fledged hypervisor.

Illustrative Computer System

Figure 24:
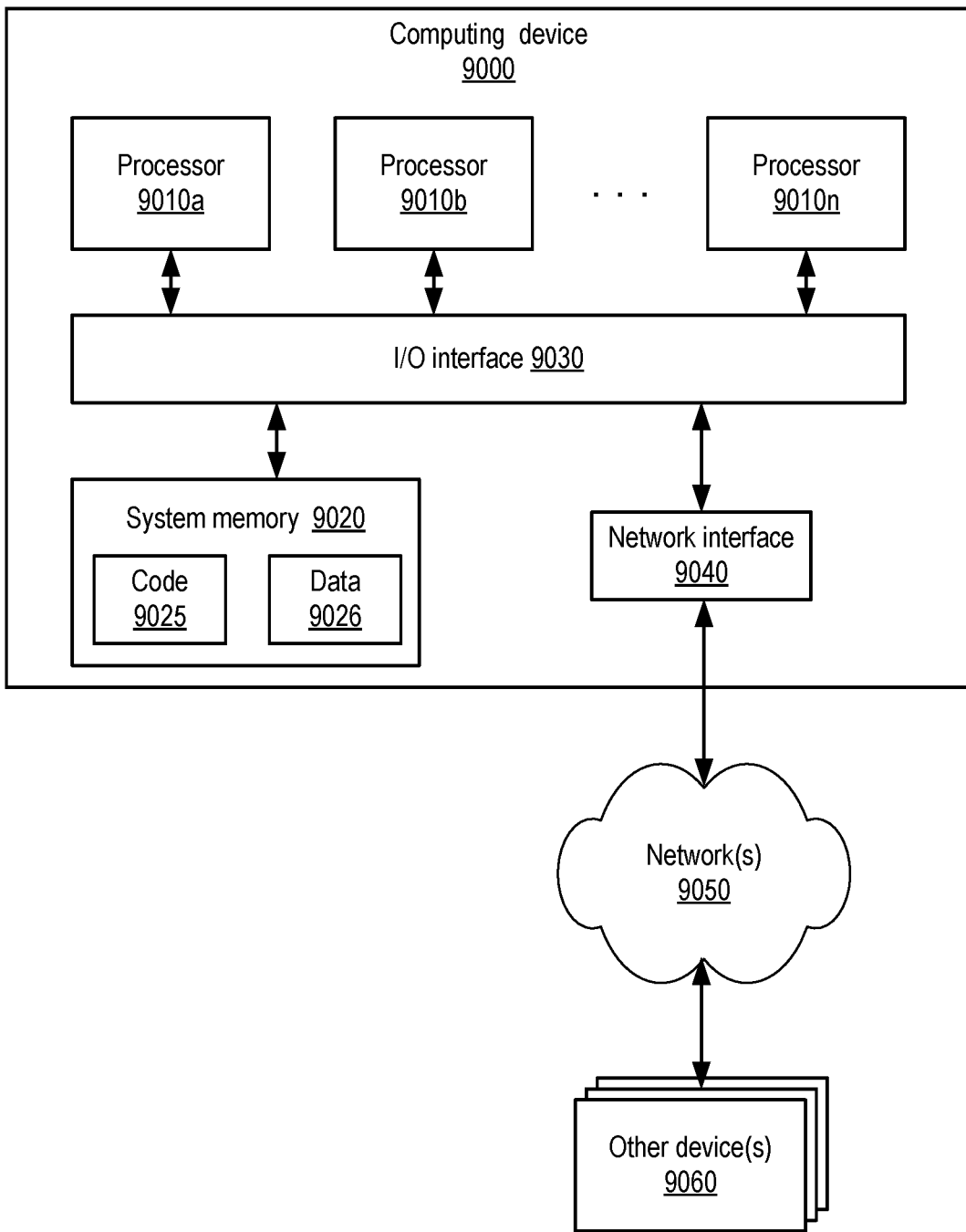
FIG. 24 is a block diagram illustrating an example computing device that may be used in at least some embodiments.

In at least some embodiments, a server that implements a portion or all of one or more of the technologies described herein, including the techniques to implement partially offloaded virtualization managers and the like may include a general-purpose computer system that includes or is configured to access one or more computer-accessible media. FIG. 24 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one physical processor 9010, or a multiprocessor system including several physical processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of offload cards, persistent and/or volatile storage devices and the like. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) or PCI-Express bus standard, or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 23, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 23 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 24 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a virtualization host including an offload card, wherein the offload card comprises one or more processors and memory configured to implement one or more components of a virtualization manager;
wherein the one or more components of the virtualization manager are configured to:
launch, during a boot operation, a first version and a second version of a virtualization controller, wherein the second version is obtained using the first version; and
initialize, during the boot operation, at least one other component of the virtualization manager at a processor which is not installed on the offload card.

2. The system as recited in claim 1, wherein the at least one other component comprises at least a portion of a hypervisor.

3. The system as recited in claim 1, wherein the at least one other component comprises a device configured to offload network processing operations from one or more CPUs of the virtualization host.

4. The system as recited in claim 1, wherein the one or more components of the virtualization manager are further configured to:
validate at least one firmware program during the boot operation.

5. The system as recited in claim 1, wherein the one or more components of the virtualization manager are further configured to:
obtain a security key from a tamper-resistant device; and
utilize the security key during the boot operation.

6. The system as recited in claim 1, wherein the one or more components of the virtualization manager are further configured to:
initiate a launch of a guest virtual machine of the virtualization host.

7. The system as recited in claim 1, wherein the one or more components of the virtualization manager are further configured to:
communicate with the at least one other component via a peripheral interconnect.

8. A method, comprising:
performing, using one or more components of a virtualization manager at an offload card of a virtualization host:
launching, during a boot operation, a first version of a virtualization controller;
launching, during the boot operation, a second version of the virtualization controller, wherein the second version is obtained using the first version; and
initializing, during the boot operation, at least one other component of the virtualization manager at a processor which is not installed on the offload card.

9. The method as recited in claim 8, wherein the at least one other component comprises at least a portion of a hypervisor.

10. The method as recited in claim 8, wherein the at least one other component comprises a device configured to offload network processing operations from one or more CPUs of the virtualization host.

11. The method as recited in claim 8, further comprising performing, using the one or more components of the virtualization manager at the offload card:
validating at least one firmware program during the boot operation.

12. The method as recited in claim 8, further comprising performing, using the one or more components of the virtualization manager at the offload card:
obtaining a security key from a tamper-resistant device; and
utilizing the security key during the boot operation.

13. The method as recited in claim 8, further comprising performing, using the one or more components of the virtualization manager at the offload card:
initiating a launch of a guest virtual machine of the virtualization host.

14. The method as recited in claim 8, further comprising performing, using the one or more components of the virtualization manager at the offload card:
obtaining, during the boot operation, software state information or firmware state information from one or more processor control register (PCRs).

15. One or more non-transitory computer-accessible storage media storing program instructions that when executed on or across one or more processors of an offload card implement an offloaded component of a virtualization manager, wherein the offloaded component is configured to:
launch, during a boot operation, a first version of a virtualization controller;
launch, during the boot operation, a second version of the virtualization controller, wherein the second version is obtained using the first version; and initialize, during the boot operation, at least one other component of the virtualization manager at a processor which is not installed on the offload card.

16. The one or more non-transitory computer-accessible storage media as recited in claim 15, wherein the at least one other component comprises at least a portion of a hypervisor.

17. The one or more non-transitory computer-accessible storage media as recited in claim 15, wherein the at least one other component comprises a device configured to offload network processing operations from one or more CPUs of a virtualization host.

18. The one or more non-transitory computer-accessible storage media as recited in claim 15, wherein the offloaded component is further configured to:
  validate at least one firmware program during the boot operation.

19. The one or more non-transitory computer-accessible storage media as recited in claim 15, wherein the offloaded component is further configured to:
  obtain a security key from a tamper-resistant device; and
  utilize the security key during the boot operation.

20. The one or more non-transitory computer-accessible storage media as recited in claim 15, wherein at least a portion of the second version of the controller is launched using chain loading.

* * * * *